US009175987B2

(12) United States Patent
Kuroda

(10) Patent No.: US 9,175,987 B2
(45) Date of Patent: Nov. 3, 2015

(54) DISPLACEMENT DETECTING DEVICE

(75) Inventor: Akihiro Kuroda, Isehara (JP)

(73) Assignee: DMG MORI SEIKI CO., LTD., Yamatokoriyama (JP)

( * ) Notice: Subject to any disclaimer, the term of this patent is extended or adjusted under 35 U.S.C. 154(b) by 59 days.

(21) Appl. No.: 13/194,324

(22) Filed: Jul. 29, 2011

(65) Prior Publication Data

US 2012/0050748 A1 Mar. 1, 2012

(30) Foreign Application Priority Data

Aug. 31, 2010 (JP) .................................. 2010-194995
May 11, 2011 (JP) .................................. 2011-106686

(51) Int. Cl.
*G01B 11/02* (2006.01)
*G01D 5/38* (2006.01)
*G01D 5/26* (2006.01)

(52) U.S. Cl.
CPC ............... *G01D 5/38* (2013.01); *G01D 5/266* (2013.01); *G01B 11/02* (2013.01)

(58) Field of Classification Search
CPC ........... G01D 5/38; G03F 9/00; H01L 21/027
USPC .......... 250/227, 559.32, 559.28, 559.37, 231, 250/237; 356/499, 482, 498, 486, 484
See application file for complete search history.

(56) References Cited

U.S. PATENT DOCUMENTS

| | | | | |
|---|---|---|---|---|
| 4,710,026 A * | 12/1987 | Magome et al. | ............... | 356/488 |
| 4,872,751 A * | 10/1989 | Hercher | ........................ | 356/35.5 |
| 4,970,388 A * | 11/1990 | Nishimura et al. | ........ | 250/237 G |
| 5,141,317 A * | 8/1992 | Bollhagen et al. | ............ | 356/488 |
| 5,165,045 A * | 11/1992 | Eselun | ...................... | 250/237 G |
| 5,436,724 A * | 7/1995 | Ishizuka et al. | ................ | 356/488 |
| 5,526,116 A * | 6/1996 | de Groot | ........................ | 356/512 |
| 6,072,581 A * | 6/2000 | Stephenson et al. | .......... | 356/521 |
| 6,744,520 B2 * | 6/2004 | Chang et al. | ................... | 356/499 |
| 7,126,686 B2 * | 10/2006 | Tsujita | ........................... | 356/328 |

(Continued)

FOREIGN PATENT DOCUMENTS

| | | | |
|---|---|---|---|
| JP | A-63-38102 | | 2/1988 |
| JP | 06-241728 | * | 2/1994 |
| JP | 6-241728 A | | 9/1994 |

(Continued)

OTHER PUBLICATIONS

Translation for JP06-241728, Feb. 1994, pp. 1-19.*

*Primary Examiner* — Gregory J Toatley
*Assistant Examiner* — Maurice Smith
(74) *Attorney, Agent, or Firm* — Oliff PLC

(57) ABSTRACT

A displacement detecting device includes an irradiation optical system, an interference optical system, a light-receiving section, and a displacement detecting section. The irradiation optical system causes two light-beams to be incident on a diffraction grating respectively at different angles with respect to a plane perpendicular to the X-direction along which grating structures of the diffraction grating are periodically arranged. The interference optical system causes two Mth-order diffracted lights of respective light-beams incident on the diffraction grating to interfere with each other, so as to generate an interference light. The light-receiving section receives the interference light and detects an interference signal. The displacement detecting section detects a vertical displacement of a surface having the diffraction grating arranged thereon based on the change of the interference signal.

3 Claims, 17 Drawing Sheets

(56) References Cited

U.S. PATENT DOCUMENTS

| | | | |
|---|---|---|---|
| 7,394,550 B2* | 7/2008 | Takahashi et al. | 356/499 |
| 2009/0257066 A1* | 10/2009 | Tamiya et al. | 356/482 |
| 2011/0096334 A1* | 4/2011 | Ishizuka | 356/484 |

FOREIGN PATENT DOCUMENTS

| | | | |
|---|---|---|---|
| JP | 06241728 | * | 9/1994 |
| JP | A-2006-322835 | | 11/2006 |
| JP | A-2008-258928 | | 10/2008 |

* cited by examiner

DIRECTION ALONG WHICH GRATING STRUCTURES ARE PERIODICALLY ARRANGED

DIRECTION ALONG WHICH GRATING
STRUCTURES ARE PERIODICALLY ARRANGED

DIRECTION ALONG WHICH GRATING
STRUCTURES ARE PERIODICALLY ARRANGED

DIRECTION ALONG WHICH GRATING STRUCTURES ARE PERIODICALLY ARRANGED

DISPLACEMENT DETECTING DEVICE

CROSS REFERENCES TO RELATED APPLICATIONS

The present invention contains subject matter related to Japanese Patent Application Nos. JP 2010-194995 filed in the Japanese Patent Office on Aug. 31, 2010 and JP 2011-106686 filed in the Japanese Patent Office on May 11, 2011, the entire contents of which being incorporated herein by reference.

BACKGROUND OF THE INVENTION

1. Field of the Invention

The present invention relates to a displacement detecting device adapted to detect the displacement in a direction perpendicular to a surface having a diffraction grating arranged thereon by using interference of light.

2. Description of the Related Art

Conventionally, displacement detecting devices for detecting the displacement in a direction perpendicular to a surface-to-be-measured are widely used. An example of such displacement detecting devices is described in Japanese Unexamined Patent Application Publication No. H06-241728. In the displacement detecting device described in Japanese Unexamined Patent Application Publication No. H06-241728, two pairs of monochromatic lights are used, each pair including two monochromatic lights having slightly mutually different frequencies. The two light-beams of each pair are incident on a diffraction grating of a first object and a diffraction grating of a second object. The two light-beams have mutually different incidence angles on both sides of the optical axis, and the incident directions of the two light-beams are asymmetrical to each other with respect to the optical axis. The two pairs are reverse-symmetrical to each other on both sides of the optical axis.

Next, two or more beams of diffracted lights, which have been subjected to light heterodyne interference, are taken out from two positions symmetrical to each other on both sides of the optical axis. Thus, phases $\phi xz$, $\phi xz'$ of light heterodyne detection signals are detected based on variation of optical path difference generated due to a position deviation in an X-direction parallel to a surface having two diffraction gratings arranged thereon and a position deviation in a Z-direction perpendicular to the surface having two diffraction gratings arranged thereon. Further, two-dimensional phase changes $\phi x$, $\phi z$ of the two objects in the X-direction and the Z-direction are calculated based on sum and difference of the expression of phase $\phi xz$ and the expression of phase $\phi xz'$.

SUMMARY OF THE INVENTION

However, in the displacement detecting device described in Japanese Unexamined Patent Application Publication No. H06-241728, since displacement information of two directions, as phase, is included in the light heterodyne detection signals at the same time, a new calculation means needs to be added in order to detect only the displacement in the Z-direction. Thus, processing circuit becomes complicated, and response speed and resolution related to detection are reduced.

In view of the above problems, it is an object of the present invention to provide a displacement detecting device capable of detecting only the displacement in a direction perpendicular to a surface having a diffraction grating arranged thereon.

To achieve the aforesaid object, a displacement detecting device according to an aspect of the present invention includes an irradiation optical system, an interference optical system, a light-receiving section, and a displacement detecting section. The irradiation optical system causes two light-beams to be incident on the diffraction grating respectively at different angles with respect to a plane perpendicular to a direction along which grating structures of the diffraction grating are periodically arranged. The interference optical system causes Mth-order diffracted lights of respective light-beams incident on the diffraction grating to interfere with each other, so as to generate an interference light. The light-receiving section receives the interference light to detect an interference signal. The displacement detecting section detects vertical displacement of a surface having the diffraction grating arranged thereon based on the change of the interference signal.

In the aforesaid displacement detecting device, the irradiation optical system causes two light-beams to be incident on the diffraction grating respectively at different angles with respect to the plane perpendicular to the direction along which grating structures of the diffraction grating are periodically arranged. With such an arrangement, the phase changes of the Mth-order diffracted lights of respective light-beams incident on the diffraction grating will be in phase even when the diffraction grating moves in the direction (an X-direction) along which the grating structures are periodically arranged. Thus, the interference signal obtained by causing the Mth-order diffracted lights of respective light-beams to interfere with each other will not change.

On the other hand, when the surface having the diffraction grating arranged thereon moves in the vertical direction (a Z-direction), the geometric optical path length of the two light-beams will change, so that the Mth-order diffracted lights of respective light-beams will be out of phase. At this time, since the Mth-order diffracted lights of respective light-beams are out of phase by different amounts, the interference signal obtained by causing the Mth-order diffracted lights of respective light-beams to interfere with each other will change. Since the change of the interference signal is proportional to the displacement of the surface having the diffraction grating arranged thereon in the Z-direction, the displacement of the surface having the diffraction grating arranged thereon in the Z-direction can be detected based on the change of the interference signal.

Further, in the aforesaid displacement detecting device, it is possible to use two light-beams to detect only the vertical displacement of the surface having the diffraction grating arranged thereon. Thus, only one grating interferometer is required, instead of requiring two grating interferometers for canceling the change of the interference signal caused by the displacement in the X-direction, as is described in Japanese Unexamined Patent Application Publication No. H06-241728. Thus, the number of components can be reduced, and the size of the device can be reduced.

According to the present invention, it is possible to easily detect only the vertical displacement of the surface having the diffraction grating arranged thereon.

DETAILED DESCRIPTION OF THE PREFERRED EMBODIMENTS

Figure 1A:
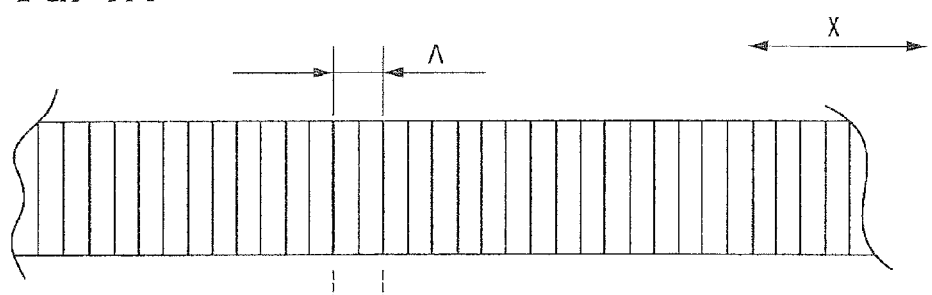
FIGS. 1A and 1B are views showing a first concrete example of a diffraction grating.

The preferred embodiments for implementing the displacement detecting device of the present invention will be described below with reference to FIGS. 1A to 31. Note that, in the drawings, like components are denoted by like reference numerals.

<Diffraction Grating>

First, a diffraction grating 100 arranged on a surface-to-be-measured will be described below with reference to FIGS. 1A and 1B.

FIG. 1A is a plan view showing a first concrete example of the diffraction grating 100 arranged on the surface-to-be-measured. FIG. 1B is a side view showing the first concrete example of the diffraction grating 100.

Figure 1B:
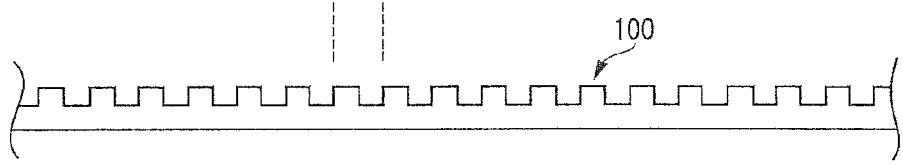

The diffraction grating 100 shown in FIGS. 1A and 1B is arranged on the surface-to-be-measured, and is formed by periodically arranging surface relief profile grating structures along a predetermined direction. Hereinafter, the direction along which the grating structures are periodically arranged is defined as an "X-direction", and the grating pitch is "A". Further, the surface having the diffraction grating 100 arranged thereon is referred to as "grating surface".

<Definition of Diffraction Angle and Diffraction Order>

Next, the definition of "diffraction angle" will be described below with reference to FIGS. 2A and 2B.

Figure 2A:
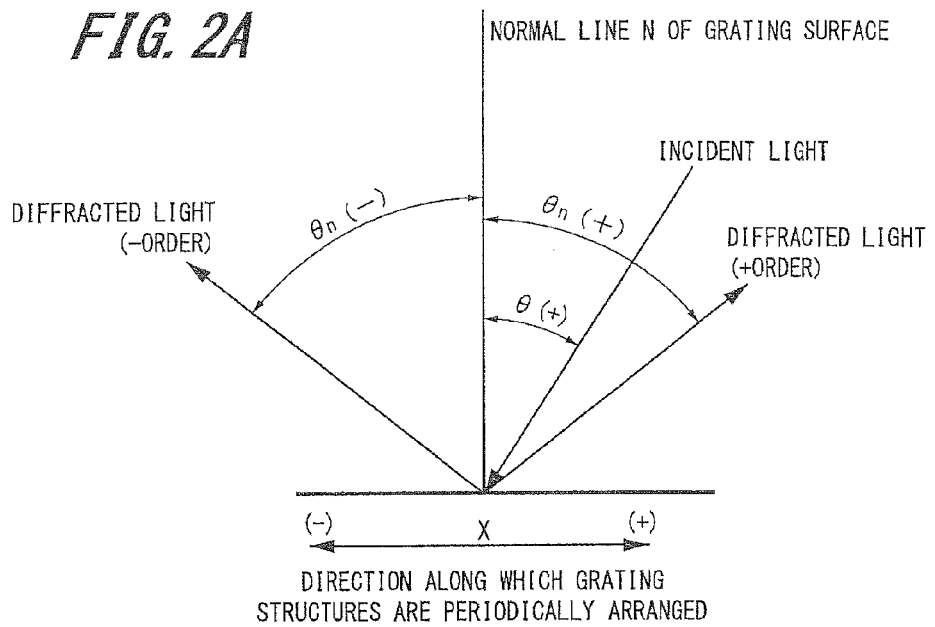
FIGS. 2A and 2B are views for explaining the definitions of "diffraction angle" and "diffraction order"
Figure 2B:
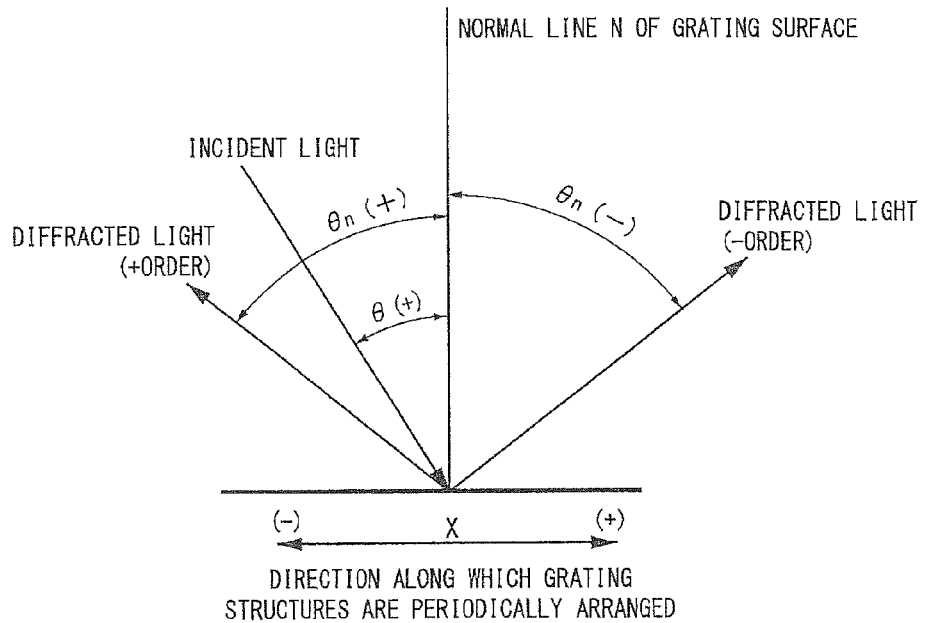

FIGS. 2A and 2B are views for explaining the definition of the "diffraction angle" of a diffracted light.

As shown in FIGS. 2A and 2B, in the description of the present invention, an incidence angle δ between a normal line N of the grating surface having the diffraction grating arranged thereon and an incident light is constantly positive (+). It is defined that the diffraction angle $\theta_n$ of a diffracted light diffracted to the side of the incident light, with the normal line N as the reference, is positive (+). Further, it is defined that the diffraction angle $\theta_n$ of a diffracted light diffracted to the side opposite to the side of the incident light, with the normal line N as the reference, is negative (−).

The incidence angle θ and the diffraction angle $θ_n$ satisfy the following equation.

$$\sin θ_n = \frac{mλ_0}{Λn} - \sin θ \quad (1)$$

$λ_0$: wavelength of incident light
m: diffraction order
Λ: pitch of diffraction grating (period of periodic structure)
n: refractive index of medium <Basic Principle of Displacement Detecting Device>

Next, the basic principle of displacement detecting device will be described below with reference to FIGS. 3 to 5.

Figure 3:
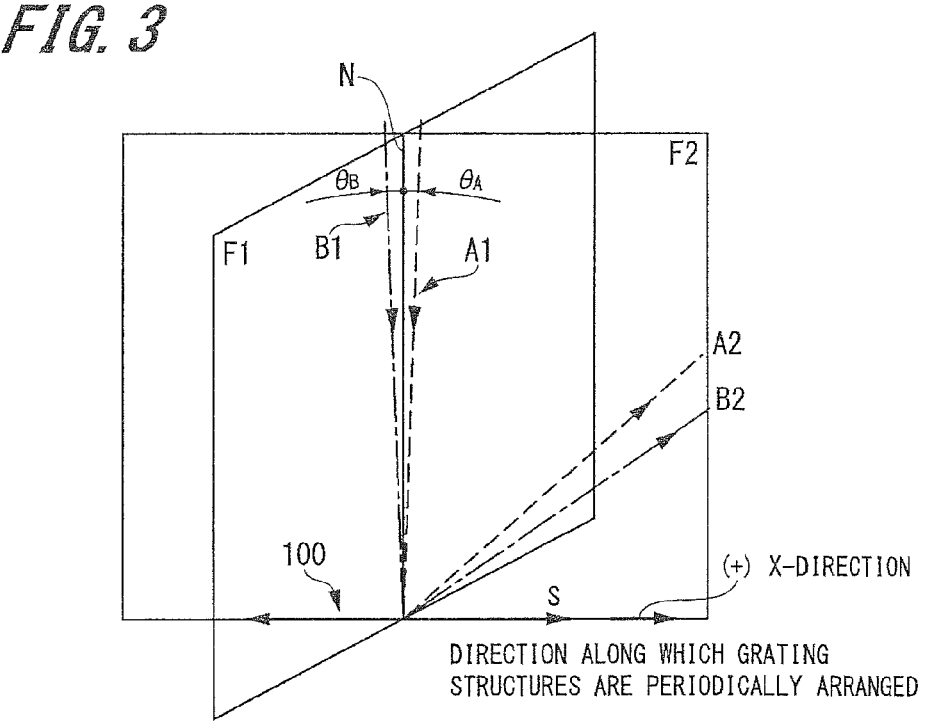
FIG. 3 is a view showing a first example of an incident light and a diffracted light in a displacement detecting device according to the present invention.

FIG. 3 is a view showing a first example of the incident light and the diffracted light in the displacement detecting device according to the present invention. FIG. 4 is a view showing the optical path of the incident light and the diffracted light when the grating surface shown in FIG. 3 has moved in the vertical direction.

A virtual plane F1 shown in FIG. 3 is a plane perpendicular to a straight line S that extends in the X-direction, along which the grating structures of the diffraction grating are periodically arranged. A virtual plane F2 shown in FIG. 3 is a plane perpendicular to the virtual plane F1, the virtual plane F2 including the straight line S. The line where the virtual plane F1 and the virtual plane F2 intersect one another is the normal line N of the grating surface. Further, the diffraction grating shown in FIG. 3 is a reflective diffraction grating.

The incident lights A1, B1 are incident at substantially the same point on the diffraction grating respectively at angles $θ_A$, $θ_B$ from opposite directions with respect to the virtual plane F1. The incident lights A1, B1 are diffracted by the diffraction grating, so that a +mth-order diffracted light A2 of the incident light A1 and a −mth-order diffracted light B2 of the incident light B1 are generated. When the grating surface moves in the (+) X-direction, which extends along the straight line S, by a distance x, an amplitude $E_A$ of the diffracted light A2 and an amplitude $E_B$ of the diffracted light B2 are expressed by the following equations, wherein represents the maximum amplitude of the diffracted light A2, and "B" represents the maximum amplitude of the diffracted light B2.

$$E_A = A \cos(-mKx + δ_A) \quad (2)$$

$$E_B = B \cos(-mKx + δ_B) \quad (3)$$

$$K = 2π/Λ$$

$δ_A$, $δ_B$: initial phases

It can be known from equations (2) and (3) that, even if the grating surface moves in the (+) X-direction, which extends along the straight line S, by a distance x, the phase change of the diffracted light A2 and the phase change of the diffracted light B2 will be in phase with each other. Thus, it can be known that, even if the diffracted light A2 and the diffracted light B2 are interfered with each other, the interference signal will not change at all.

Figure 4:
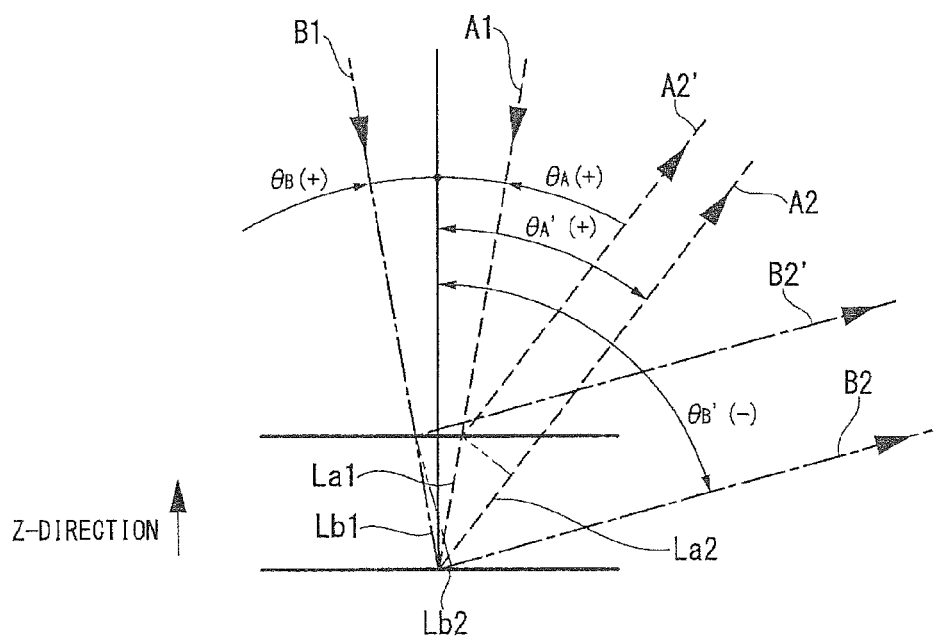
FIG. 4 is a view showing the optical path of the incident light and the diffracted light when a surface having the diffraction grating arranged thereon has moved in the vertical direction from the state shown in FIG. 3.

As shown in FIG. 4, if the grating surface moves along the normal line N in the (+) Z-direction by a distance z, the incidence point of the incident light A1 will move in the (+) X-direction on the grating surface by a distance z tan $θ_A$. On the other hand, the incidence point of the incident light B1 will move in the (−) X-direction on the grating surface by a distance z tan $θ_B$. Further, since a geometric optical path length change ΔLA and a geometric optical path length change ΔLB are respectively caused in the diffracted light A2 and the diffracted light B2, the diffracted light A2 and the diffracted light B2 become a diffracted light A2' and a diffracted light B2'. The amplitudes $E_A$ and $E_B$ of the diffracted lights A2' and B2' are expressed by the following equations.

$$E_A = A \cos\left(+mKz\tan θ_A + \frac{2π}{λ}ΔLA + δ_A\right) \quad (4)$$

$$E_B = B \cos\left(-mKz\tan θ_B + \frac{2π}{λ}ΔLB + δ_B\right) \quad (5)$$

Further, when the diffracted lights A2' and B2' are mixed so as to be interfered with each other, the intensity I of the interference signal is expressed by the following equation.

$$I = \frac{1}{2}A^2 + \frac{1}{2}B^2 + \\ AB\cos\left(kmz(\tan θ_A + \tan θ_B) + \frac{2π}{λ}(ΔLA - ΔLB) + δ_A - δ_B\right) \quad (6)$$

It can be known from equation (6) that the displacement of the grating surface in the Z-direction can be detected as the change of the interference signal. Further, ΔLA-ΔLB is expressed by the following equation.

$$ΔLA - ΔLB = -z\left\{\frac{1 + \cos(θ'_A - θ_A)}{\cos θ_A} - \frac{1 + \cos(θ_B - θ'_B)}{\cos θ_B}\right\} \quad (7)$$

$$ΔLA = La1 + La2$$

$$ΔLB = Lb1 + Lb2$$

$θ'_A$: diffraction angle of diffracted light A
$θ'_B$: diffraction angle of diffracted light B It can be known from equation (7) that the phase change is proportional to the displacement of the grating surface in the Z-direction.

Figure 5:
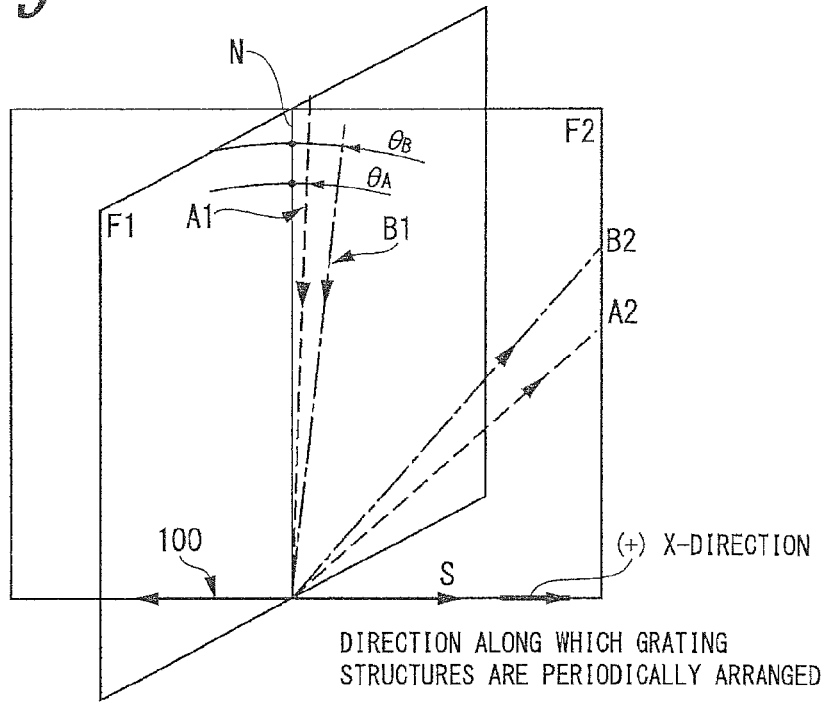
FIG. 5 is a view showing a second example of the incident light and the diffracted light in the displacement detecting device according to the present invention.
Figure 6:
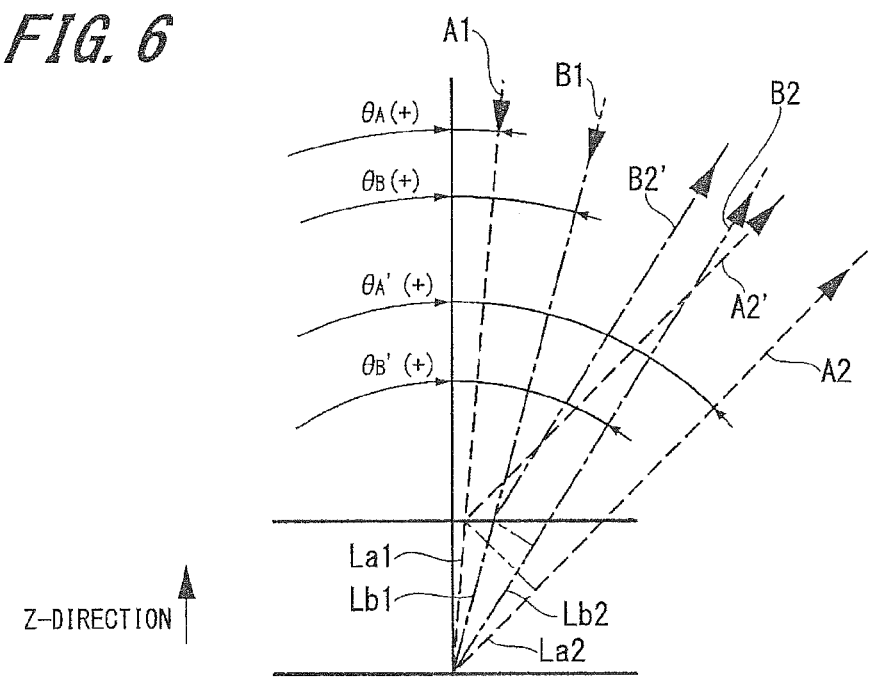
FIG. 6 is a view showing the optical path of the incident light and the diffracted light when the surface having the diffraction grating arranged thereon has moved in the vertical direction from the state shown in FIG. 5.

FIG. 5 is a view showing a second example of the incident light and the diffracted light in the displacement detecting device according to the present invention. FIG. 6 is a view showing the optical path of the incident light and the diffracted light when the grating surface shown in FIG. 5 has moved in the vertical direction.

In the second example of the incident light and the diffracted light, the incident lights A1, B1 are incident at substantially the same point of the diffraction grating from one side (i.e., the same side) of the virtual plane F1 at angles $θ_A$, $θ_B$. The incident lights A1, B1 are diffracted by the diffraction grating, so that a +mth-order diffracted light A2 of the incident light A1 and a +mth-order diffracted light B2 of the incident light B1 are generated. In such a case, similar to the first example, even if the grating surface moves in the (+) X-direction, which extends along the straight line S, the phase change of the diffracted light A2 and the phase change of the diffracted light B2 will be in phase with each other, and therefore the interference signal will not change at all.

As shown in FIG. 6, if the grating surface moves along the normal line N in the (+) Z-direction by a distance z, the incidence point of the incident light A1 will move in the (+) X-direction on the grating surface by a distance z tan $θ_A$. On the other hand, the incidence point of the incident light B1 will move in the (+) X-direction on the grating surface by a distance z tan $θ_B$. Further, a geometric optical path length change ΔLA and a geometric optical path length change ΔLB will be caused in the diffracted light A2 and the diffracted light B2 respectively, and thereby the diffracted light A2 and the diffracted light B2 become a diffracted light A2' and a diffracted light B2' respectively. The amplitudes $E_A$ and $E_B$ of the diffracted lights A2' and B2' are respectively expressed by the following equations.

$$E_A = A\cos\left(mKz\tan\theta_A + \frac{2\pi}{\lambda}\Delta LA + \delta_A\right) \quad (8)$$

$$E_B = B\cos\left(mKz\tan\theta_B + \frac{2\pi}{\lambda}\Delta LB + \delta_B\right) \quad (9)$$

Further, when the diffracted lights A2' and B2' are mixed so as to be interfered with each other, the intensity I of the interference signal is expressed by the following equation.

$$I = \frac{1}{2}A^2 + \frac{1}{2}B^2 + \\ AB\cos\left(kmz(\tan\theta_A - \tan\theta_B) + \frac{2\pi}{\lambda}(\Delta LA - \Delta LB) + \delta_A - \delta_B\right) \quad (10)$$

It can be known from equation (10) that the displacement of the grating surface in the Z-direction can be detected as the change of the interference signal. Further, $\Delta LA - \Delta LB$ is expressed by the following equation.

$$\Delta LA - \Delta LB = -z\left\{\frac{1+\cos(\theta'_A - \theta_A)}{\cos\theta_A} - \frac{1+\cos(\theta'_B - \theta_B)}{\cos\theta_B}\right\} \quad (11)$$

$$\Delta LA = La1 + La2$$

$$\Delta LB = Lb1 + Lb2$$

It can be known from equation (11) that the phase change is proportional to the displacement of the grating surface in the Z-direction. As described using the above two examples, by making two light-beams incident on the diffraction grating at different angles with respect to a plane perpendicular to the X-direction, the interference signal changes when the grating surface has moved in the vertical direction (i.e., the Z-direction). Further, the change of the interference signal is proportional to the displacement of the grating surface in the Z-direction. As a result, the vertical displacement of the grating surface can be detected based on the change of the interference signal.

Incidentally, the Mth-order diffracted light in the present invention includes a +mth order diffracted light and a −mth order diffracted light. In other words, as the first example of the incident light and the diffracted light (see FIGS. 3 and 4), in the case where the incident lights A1, B1 are incident from opposite directions with respect to the normal line N of the grating surface, the Mth-order diffracted light is a combination of a +mth-order diffracted light and a −mth-order diffracted light. Further, as the second example of the incident light and the diffracted light (see FIGS. 5 and 6), in the case where the incident lights A1, B1 are incident from the same side of the normal line N of the grating surface, the Mth-order diffracted light is a combination of two +mth-order diffracted lights or a combination of two −mth-order diffracted lights.

Thus, the displacement detecting device needs to be provided with an irradiation optical system adapted to cause two light-beams to be incident on the diffraction grating respectively at different angles with respect to a plane perpendicular to the direction along which the grating structures of the diffraction grating are periodically arranged. Further, the displacement detecting device is also provided with an interference optical system for making the Mth-order diffracted lights of the two light-beams incident on the diffraction grating so as to interfere with each other to generate an interference light, a light-receiving section for receiving the interference light to detect the interference signal, and a displacement detecting section for detecting the vertical displacement of the grating surface based on the change of the interference signal.

<First Embodiment of Displacement Detecting Device>

Next, a displacement detecting device according to a first embodiment of the present invention will be described below with reference to FIG. 7.

Figure 7:
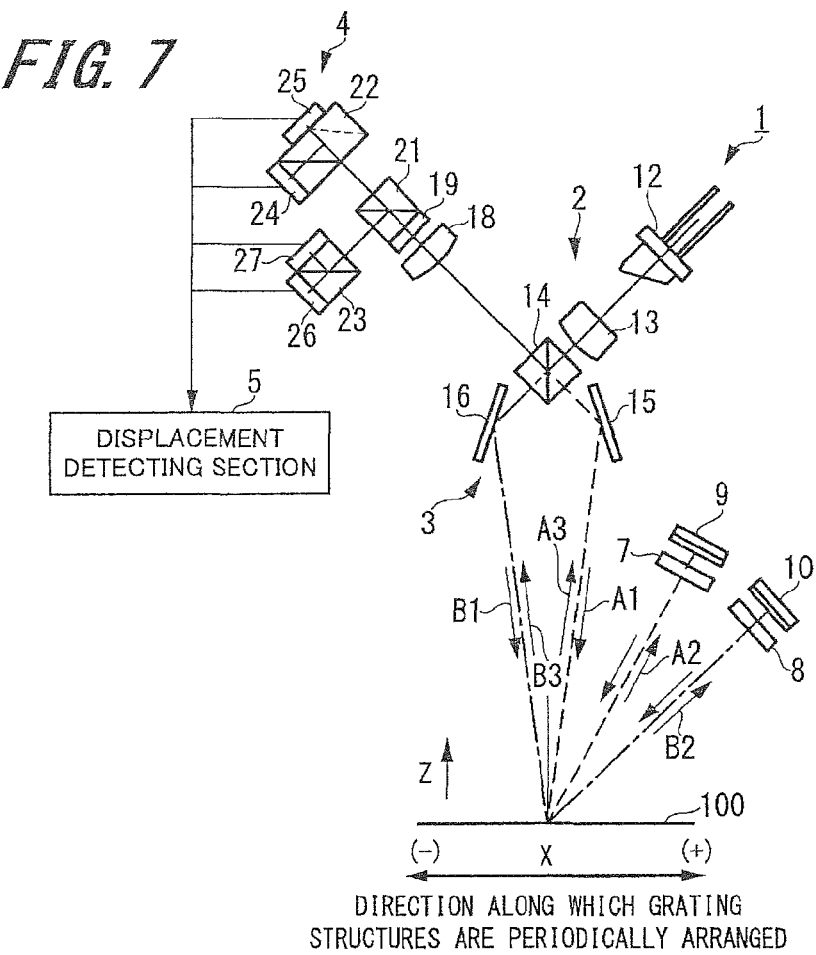
FIG. 7 is a view schematically showing the configuration of a displacement detecting device according to a first embodiment of the present invention.

FIG. 7 is a view schematically showing the configuration of a displacement detecting device 1 according to the first embodiment.

As shown in FIG. 7, the displacement detecting device 1 includes an irradiation optical system 2, an interference optical system 3, a light-receiving section 4, a displacement detecting section 5, two quarter-wave plates 7, 8, and two mirrors 9, 10. Further, a reflective diffraction grating 100 is arranged on a surface-to-be-measured (i.e., a grating surface).

The irradiation optical system 2 causes two light-beams to be incident on the diffraction grating 100 respectively from opposite directions with respect to a plane perpendicular to the X-direction along which the grating structures of the diffraction grating 100 are periodically arranged. The irradiation optical system 2 includes a light source 12, a collimator lens 13, a polarizing beam splitter 14, and two mirrors 15, 16.

The light source 12 is configured by, for example, a multimode semiconductor laser, a LED or the like, and is adapted to emit a coherent light. Since the frequency of the multimode semiconductor laser changes in proportion to the ambient temperature, error caused by mode hopping can be prevented, while the error caused by mode hopping can not be prevented by a single-mode semiconductor laser.

The collimator lens 13 is arranged between the light source 12 and the polarizing beam splitter 14, and is adapted to convert the light emitted from the light source 12 into a collimated light. The polarizing beam splitter 14 is adapted to split the light emitted from the light source 12 and passed through the collimator lens 13 into two light-beams, which are a first incident light A1 and a second incident light B1. For example, the polarizing beam splitter 14 reflects the s-polarized light and transmits the p-polarized light of the light from the light source 12. Further, since the polarizing beam splitter 14 is tilted at 45 degrees with respect to the polarization direction of the light source 12, the ratio of the amount of the incident light A1 to the amount of the incident light B1 is 1:1.

The mirror 15 reflects the incident light A1 so that the incident light A1 is incident on the diffraction grating 100, and the mirror 16 reflects the incident light B1 so that the incident light B1 is incident on the diffraction grating 100. The mirrors 15, 16 each have a metal film formed on a surface thereof. Thus, change in wavelength characteristic and polarization property due to change in humidity, which will be caused by a general dielectric multilayer, can be suppressed, so that it is possible to perform position detection with stability.

The optical axis of the incident light A1 and the optical axis of the incident light B1 are changed by the mirrors 15, 16, so that the incident light A1 and the incident light B1 are incident substantially at the same point of the diffraction grating 100. Further, the incident light A1 is diffracted by the diffraction grating 100 to thereby generate a +mth-order diffracted light A2, and the incident light B1 is diffracted by the diffraction grating 100 to thereby generate a -mth-order diffracted light B2.

The details about the incident direction of the incident lights A1, B1 toward the diffraction grating 100 will be described below with reference to FIG. 8.

Figure 8:
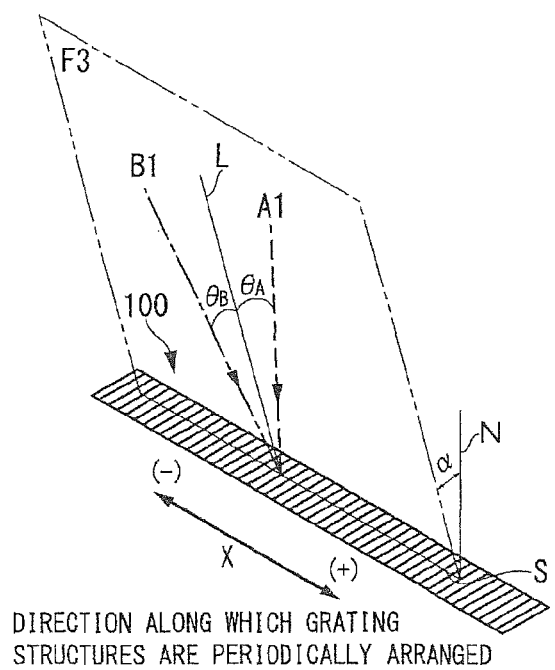
FIG. 8 is a view showing a first incident light and a second incident light in the displacement detecting device according to the first embodiment of the present invention.

FIG. 8 is a view showing the first incident light and the second incident light in the displacement detecting device according to the first embodiment.

As shown in FIG. 8, a straight line L and the incident lights A1, B1 are on a virtual plane F3. The virtual plane F3 includes the straight line S extending along the X-direction, and is tilted at an angle of α degrees with respect to the normal line N of the grating surface. The tilt angle α of the virtual plane F3 is set to a value so that the 0-order diffracted light from the diffraction grating 100 is not mixed into the optical path of the irradiation optical system 2, the optical path of the interference optical system 3, and the like. With such an arrangement, the noise can be reduced, and the displacement of the grating surface in the Z-direction can be detected with high accuracy.

Incidentally, the virtual plane F3 may also be arranged parallel to the normal line of the grating surface. In such a case, the straight line L is identical to the normal line N of the grating surface.

Further, the incident lights A1, B1 are incident at substantially the same point on the diffraction grating from opposite directions with respect to the plane perpendicular to X-direction, and the incidence angles of the incident lights A1, B1 are respectively $\theta_A$, $\theta_B$. Since the incident lights A1, B1 are incident at substantially the same point of the diffraction grating, the influence caused by unevenness in thickness and/or unevenness in refractive index of the diffraction grating 100 is reduced. To be specific, no difference is caused between the optical path length of the diffracted light A2 and the optical path length of the diffracted light A2, which will be described in more detail later, so that the displacement of the grating surface in the Z-direction can be detected with high accuracy.

Next, the diffracted light A2 will be described below with reference to FIG. 9.

Figure 9:
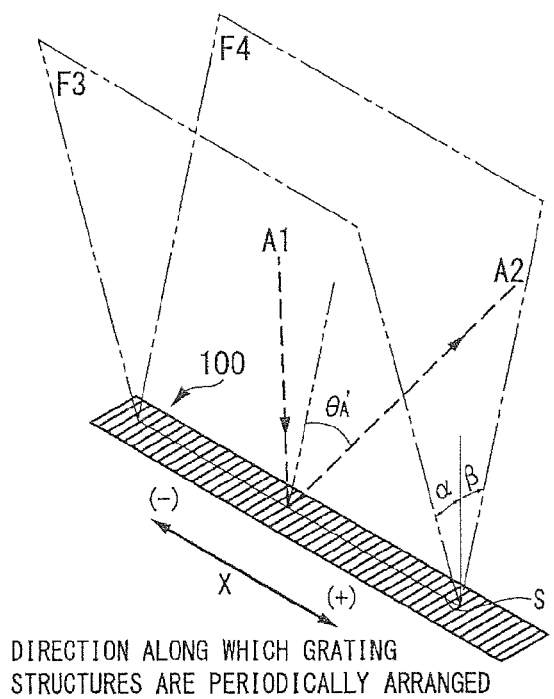
FIG. 9 is a view showing a first diffracted light in the displacement detecting device according to the first embodiment of the present invention.

FIG. 9 is a view for explaining the diffracted light A2 (a first diffracted light).

As shown in FIG. 9, the diffracted light A2 is on a virtual plane F4, and is tilted at an angle $\theta_A'$ with respect to the plane perpendicular to the X-direction. In other words, the diffraction angle of the diffracted light A2 is $\theta_A'$. Incidentally, the virtual plane F4 includes the straight line S extending along the X-direction, and is tilted at an angle of β degrees with respect to the normal line of the grating surface. As described above, the relation between the incidence angle $\theta_A$ and the diffraction angle $\theta_A'$ is expressed by equation (1). Further, the relation between the tilt angle α and the tilt angle β is expressed by the following equation.

$$\frac{\sin\alpha}{\sin\beta} = \frac{\cos\theta_A'}{\cos\theta_A} \quad (12)$$

It can be known from equation (12) that α=β when $\theta_A=\theta_A'$, and α=β when $\theta_A\neq\theta_A'$.

Next, the diffracted light B2 will be described below with reference to FIG. 10.

Figure 10:
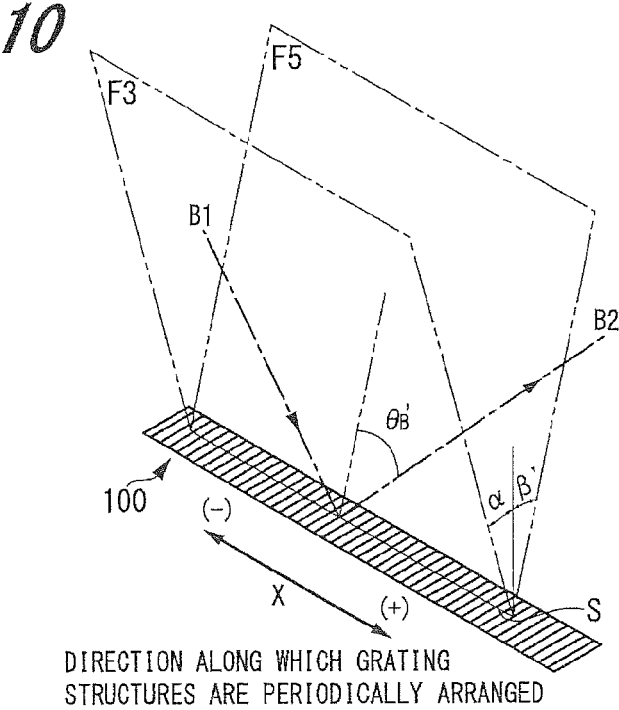
FIG. 10 is a view showing a second diffracted light in the displacement detecting device according to the first embodiment of the present invention.

FIG. 10 is a view for explaining the diffracted light B2 (a second diffracted light).

As shown in FIG. 10, the diffracted light B2 is on a virtual plane F5, and is tilted at an angle of $\theta_B'$ with respect to the plane perpendicular to the X-direction. In other words, the diffraction angle of the diffracted light B2 is $\theta_B'$. Incidentally, the virtual plane F5 includes the straight line S extending along the X-direction, and is tilted at an angle of β' degrees with respect to the normal line of the grating surface. As described above, the relation between the incidence angle $\theta_B$ and the diffraction angle $\theta_B'$ is expressed by equation (1). Similar to the relation between the tilt angle α and the tilt angle β, the relation between the tilt angle α and the tilt angle β' is expressed by the following equation.

$$\frac{\sin\alpha}{\sin\beta'} = \frac{\cos\theta_B'}{\cos\theta_B} \quad (13)$$

It can be known from equation (13) that α=β' when $\theta_B=\theta_B'$, and α≠β' when $\theta_B\neq\theta_B'$.

The configuration of the displacement detecting device 1 will be described with reference to FIG. 7 again.

As shown in FIG. 7, the mirror 9 is arranged in the optical path of the diffracted light A2, and the quarter-wave plate 7 is arranged between the mirror 9 and the diffraction grating 100. Further, the mirror 10 is arranged in the optical path of the diffracted light B2, and the quarter-wave plate 8 is arranged between the mirror 10 and the diffraction grating 100.

The optic axes of the quarter-wave plates 7, 8 are tilted at 45 degrees with respect to the polarization direction of the diffracted light A2 and the diffracted light B2 diffracted by the diffraction grating 100.

The mirror 9 and the mirror 10 are disposed so as to be perpendicular to the optical axis of the diffracted light A2 and the optical axis of the diffracted light B2 respectively, so that the mirror 9 and the mirror 10 respectively reflect the diffracted light A2 and the diffracted light B2 back to the diffraction grating 100. Similar to the mirrors 15, 16, the mirrors 9, 10 each have a metal film formed on a surface thereof.

The diffracted light (the returned light) A2 reflected by the mirror 9 is incident on the diffraction grating 100 after passing through the quarter-wave plate 7. The diffracted light A2 is diffracted again by the diffraction grating 100, so that a twice diffracted light A3 is generated.

Further, the diffracted light (the returned light) B2 reflected by the mirror 10 is incident on the diffraction grating 100 after passing through the quarter-wave plate 8. The diffracted light B2 is diffracted again by the diffraction grating 100, so that a twice diffracted light B3 is generated.

The interference optical system 3 includes the polarizing beam splitter 14 and the mirrors 15, 16. In other words, in the present embodiment, the polarizing beam splitter 14 and the mirrors 15, 16 are shared by the irradiation optical system 2 and the interference optical system 3.

The function of the mirror 15 as a component of the interference optical system 3 is to reflect the twice diffracted light A3 diffracted again by the diffraction grating 100, so that the twice diffracted light A3 is guided to the polarizing beam splitter 14. On the other hand, the function of the mirror 16 as a component of the interference optical system 3 is to reflect the twice diffracted light B3 diffracted again by the diffraction grating 100, so that the twice diffracted light B3 is guided to the polarizing beam splitter 14.

The function of the polarizing beam splitter 14 as a component of the interference optical system 3 is to superimpose the two twice diffracted lights A3, B3 respectively reflected by the mirrors 15, 16 on each other so that the two twice diffracted lights A3, B3 are interfered with each other. To be specific, the polarizing beam splitter 14 transmits the twice diffracted light A3 reflected by the mirror 15 and reflects the twice diffracted light B3 reflected by the mirror 16, so that the two twice diffracted lights A3, B3 are interfered with each other.

As described above, the optic axes of the quarter-wave plates 7, 8 are tilted at 45 degrees with respect to the polarization direction of the diffracted light A2 and the diffracted light B2 diffracted by the diffraction grating 100. With such an arrangement, the twice diffracted light A3 having passed through the quarter-wave plate 7 twice, with the incident light A1 as a reference, is transmitted through the polarizing beam splitter 14. Further, the twice diffracted light B3 having passed through the quarter-wave plate 8 twice, with the incident light B1 as a reference, is reflected by the polarizing beam splitter 14.

The light-receiving section 4 includes a lens 18, a quarter-wave plate 19, a beam splitter 21, two polarizing beam splitters 22, 23, and four light-receiving elements 24 to 27. The lens 18 converges the interference light of the twice diffracted light A3 and the twice diffracted light B3 to thereby adjust the spot on the light-receiving surface of each of the four light-receiving elements 24 to 27 to a suitable size. The quarter-wave plate 19 is arranged so that its optic axis is tilted at 45 degrees with respect to the polarization plane of the twice diffracted light A3 and the twice diffracted light B3. Thus, the twice diffracted light A3 and the twice diffracted light B3 having passed through quarter-wave plate 19 become two circularly polarized lights with mutually reversed rotational directions. Since the two circularly polarized lights with mutually reversed rotational directions are located in the same optical path, they are superimposed on each other so as to become a linearly polarized light, and the linearly polarized light is incident on the beam splitter 21.

The beam splitter 21 splits the interference light of the twice diffracted light A3 and the twice diffracted light B3 into two light-beams.

For example, the s-polarized component of the interference light of the twice diffracted light A3 and the twice diffracted light B3 is reflected by the polarizing beam splitter 22 and received by the first light-receiving element 24. On the other hand, the p-polarized component of the interference light of the twice diffracted light A3 and the twice diffracted light B3 is transmitted through the polarizing beam splitter 22 and received by the second light-receiving element 25. The phase of the electrical signal photoelectrically converted by the first light-receiving element 24 and the phase of the electrical signal photoelectrically converted by the second light-receiving element 25 are different from each other by 180 degrees.

Further, the p-polarized component of the interference light of the twice diffracted light A3 and the twice diffracted light B3 is transmitted through the polarizing beam splitter 23 and received by the third light-receiving element 26. On the other hand, the s-polarized component of the interference light of the twice diffracted light A3 and the twice diffracted light B3 is reflected by the polarizing beam splitter 23 and received by the fourth light-receiving element 27. The phase of the electrical signal photoelectrically converted by the third light-receiving element 26 and the phase of the electrical signal photoelectrically converted by the fourth light-receiving element 27 are different from each other by 180 degrees.

The polarizing beam splitter 22 of the present embodiment is arranged so as to be tilted at 45 degrees with respect to the polarizing beam splitter 23. Thus, the phase of the electrical signals obtained by the first light-receiving element 24 and the second light-receiving element 25 and the phase of the electrical signals obtained by the third light-receiving element 26 and the fourth light-receiving element 27 are different from each other by 90 degrees.

The electrical signals obtained by the first light-receiving element 24 and the second light-receiving element 25 and the electrical signals obtained by the third light-receiving element 26 and the fourth light-receiving element 27 are differential-amplified by a differential amplifier (not shown in the drawings) of the displacement detecting section 5, so as to become electrical signals having phases different by degrees, wherein the DC component of such electrical signals is cancelled. Further, the electrical signals having phases different by 90 degrees are respectively converted into digital signals by an A/D converter, and the digital signals are inputted to an arithmetic unit such as a DSP (Digital Signal Processor) or the like.

The arithmetic unit of the displacement detecting section 5 calculates the displacement of the grating surface in the Z-direction based on the change of the obtained electrical signals (i.e., the interference signals). Further, the electrical signals having phases different by 90 degrees are subjected to a forward/reverse discrimination performed by a pulse discriminator circuit (not shown in the drawings) arranged in the displacement detecting section 5. In other words, a discrimination is performed to see whether the grating surface is displaced in the (+) Z-direction or the (−) Z-direction.

In the present embodiment, the optical path length related to the incident light A1 is equal to the optical path length related to the incident light B1. To be specific, a multimode semiconductor laser having a coherence length of hundreds μm is used as the light source 12, and the position of the mirrors 15, 16 is adjusted so that visibility of the interference signals becomes maximum. With such an arrangement, since the optical path length difference between the two light-beams to be interfered with each other can be reduced, the detection error caused by wavelength variation of the light source 12 can be minimized.

Next, the operation of the displacement detecting device 1 will be described below.

As shown in FIG. 7, the light emitted from the light source 12 is converted into a collimated light by the collimator lens 13, and the collimated light is split into the incident light A1 and the incident light B1 by the polarizing beam splitter 14. The incident light A1 is reflected by the mirror 15 so as to be incident on the diffraction grating 100. On the other hand, the incident light B1 is reflected by the mirror 16 so as to be incident on the diffraction grating 100. At this time, the incident light A1 and the incident light B1 are incident on the diffraction grating 100 respectively from opposite directions with respect to a plane perpendicular to the X-direction, along which the grating structures of the diffraction grating 100 are periodically arranged, and the incidence point of the incident light A1 and the incidence point of the incident light B1 are substantially the same.

The incident light A1 is diffracted by the diffraction grating 100, so that the +mth-order diffracted light A2 is generated. The diffracted light A2 is passed through the quarter-wave plate 7, reflected by the mirror 9, and then passed through the quarter-wave plate 7 again so as to be incident on the diffraction grating 100 where the diffracted light A2 is diffracted. The diffracted light A2 is diffracted by the diffraction grating 100, so that the twice diffracted light A3 is generated. The twice diffracted light A3 is brought back to the optical path of the incident light A1 so as to be incident on the polarizing beam splitter 14.

On the other hand, the incident light B1 is diffracted by the diffraction grating 100, so that the −mth-order diffracted light B2 is generated. The diffracted light B2 is passed through the quarter-wave plate 8, reflected by the mirror 10, and then passed through the quarter-wave plate 8 again so as to be incident on the diffraction grating 100 where the diffracted light B2 is diffracted. The diffracted light B2 is diffracted by the diffraction grating 100, so that the twice diffracted light B3 is generated. The twice diffracted light B3 is brought back to the optical path of the incident light B1 so as to be incident on the polarizing beam splitter 14.

Here, the amplitudes of the twice diffracted lights A3, B3 will be described below.

By being reflected by the mirror 9, the twice diffracted light A3 has been diffracted twice by the diffraction grating 100. Further, by being reflected by the mirror 10, the twice diffracted light B3 has been diffracted twice by the diffraction grating 100. Thus, when the diffraction surface has moved in the (+) X-direction, the amplitudes $E_A$, $E_B$ of the twice diffracted light A3, B3 are expressed by the following equations.

$$E_A = A\cos(-2mKx+\delta_A) \quad (14)$$

$$E_B = B\cos(-2mKx+\delta_B) \quad (15)$$

As can be known from equations (14) and (15) that, since the twice diffracted light A3 and the twice diffracted light B3 are in phase with each other, when the diffraction surface has moved in the (+) X-direction, even if the twice diffracted light A3 and the twice diffracted light B3 are interfered with each other, the interference signal will not change.

Next, the case where the grating surface has moved in the Z-direction will be described below.

In the case where the grating surface has moved in the Z-direction, the position shift between the incidence point of the incident light A1 and the incidence point of the incident light B1 is identical to that shown in FIG. 4, and the amplitudes $E_A$, $E_B$ of the twice diffracted lights A3, B3, which have been diffracted twice, are expressed by the following equations.

$$E_A = A\cos\left(+2mKz\tan\theta_A + \frac{2\pi}{\lambda}\Delta LA' + \delta_A\right) \quad (16)$$

$$E_B = B\cos\left(-2mKz\tan\theta_B + \frac{2\pi}{\lambda}\Delta LB' + \delta_B\right) \quad (17)$$

The value of $\Delta LA'$ in equation (16) is about twice the value of $\Delta LA$ in equation (4). Similarly, the value of $\Delta LB'$ in equation (17) is about twice the value of $\Delta LB$ in equation (5).

The twice diffracted lights A3, B3 having such amplitudes are superimposed on each other by the polarizing beam splitter 14 so as to be interfered with each other. The intensity I of the interference signal obtained in the above manner is expressed by the following equation, and the displacement of the grating surface in the Z-direction can be detected as the change of the interference signal.

$$I = \frac{1}{2}A^2 + \frac{1}{2}B^2 + \quad (18)$$
$$AB\cos\left(2kmz(\tan\theta_A + \tan\theta_B) + \frac{2\pi}{\lambda}(\Delta LA' - \Delta LB') + \delta_A - \delta_B\right)$$

The twice diffracted lights A3, B3 having been superimposed on each other pass through the lens 18 and the quarter-wave plate 19 so as to become two circularly polarized lights with mutually reversed rotational directions. Since the two circularly polarized lights with mutually reversed rotational directions are located in the same optical path, they are superimposed on each other so as to become a linearly polarized light, and the linearly polarized light is incident on the beam splitter 21 as interference light. The interference light of the twice diffracted light A3 and the twice diffracted light B3 is slit into two beams by the beam splitter 21, and the two beams are respectively incident on the polarizing beam splitter 22 and the polarizing beam splitter 23.

The interference light of the twice diffracted light A3 and the twice diffracted light B3 incident on the polarizing beam splitter 22 is split into a s-polarized component and a p-polarized component. Further, the s-polarized component is received by the first light-receiving element 24, and the p-polarized component is received by the second light-receiving element 25.

Similarly, the interference light of the twice diffracted light A3 and the twice diffracted light B3 incident on the polarizing beam splitter 23 is split into a s-polarized component and a p-polarized component. Further, the p-polarized component is received by the third light-receiving element 26, and the s-polarized component is received by the fourth light-receiving element 27.

The electrical signals photoelectrically converted by the light-receiving elements 24 to 27 are inputted to the displacement detecting section 5. In the displacement detecting section 5, the electrical signals obtained by the first light-receiving element 24 and the second light-receiving element 25 are differential-amplified by the differential amplifier, and the DC component of the interference signals is cancelled.

Further, the electrical signals having the DC component cancelled are converted into digital signals by the A/D converter, and the digital signals are inputted to the arithmetic unit. The arithmetic unit performs a waveform correction process on the received digital signals, and then generates, for example, an A-phase incremental signal.

Further, in the displacement detecting section 5, the electrical signals obtained by the third light-receiving element 26 and the fourth light-receiving element 27 are differential-amplified by the differential amplifier, the differential-amplified signals are converted into digital signals by the A/D converter, and the digital signals are transmitted to the arithmetic unit. The arithmetic unit performs a waveform correction process on the received digital signals, and then generates a B-phase incremental signal whose phase is different from the A-phase incremental signal by 90 degrees.

The displacement detecting section counts the phase change per unit time of the generated incremental signals by a counter, and detects the displacement of the grating surface in the Z-direction based on the count value. The displacement can be detected by using only one incremental signal; however, in the present embodiment, two incremental signals whose phases are different from each other by 90 degrees are employed. With such an arrangement, it is possible to discriminate the displacement direction, and further, it is possible to interpolate signals with large magnification by calculating A tan θ based on the two signals, so that high resolution can be obtained. As a result, the displacement can be detected with high accuracy.

Further, forward/reverse discrimination is performed on the two incremental signals by the pulse discriminator circuit and the like. Thus, it is possible to detect whether the displacement of the grating surface in the Z-direction is in positive direction or in negative direction.

Further, the displacement detecting device 1 may also be provided with a storage element such as an EP-ROM (Erasable Programmable-ROM) or the like. By storing data related to the displacement of the grating surface in the Z-direction measured by an external measuring device, the arithmetic unit can compare the detected displacement with the data related to the displacement stored in the storage element so as to correct the detected value.

<Second Embodiment of Displacement Detecting Device>

Next, a displacement detecting device according to a second embodiment of the present embodiment will be described below with reference to FIGS. 11 and 12.

Figure 11:
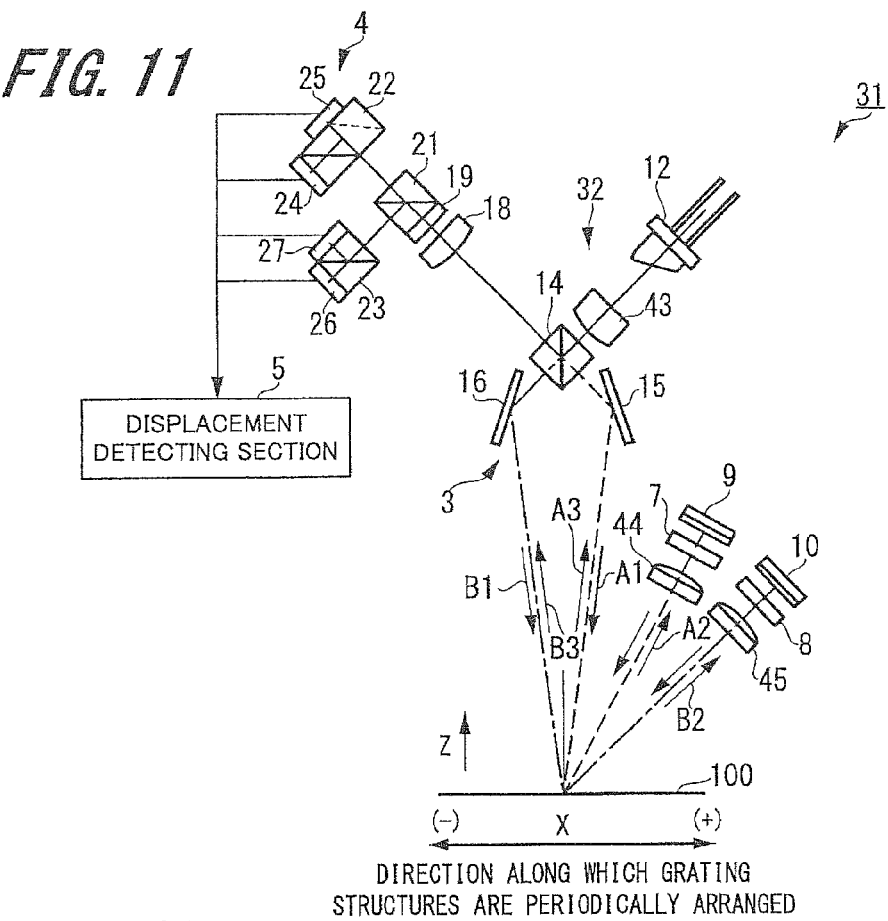
FIG. 11 is a view schematically showing the configuration of a displacement detecting device according to a second embodiment of the present invention.

FIG. 11 is a view schematically showing the configuration of a displacement detecting device 31 according to the second embodiment. FIG. 12 is a view showing the tilt of the grating surface toward the pitching direction or the azimuth direction.

As shown in FIG. 11, the displacement detecting device 31 of the second embodiment has the same configuration as that of the displacement detecting device 1 (see FIG. 7) of the first embodiment. The displacement detecting device 31 differs from the displacement detecting device 1 in that the displacement detecting device 31 has a lens 43 arranged in an irradiation optical system 32, and two lenses 44, 45 respectively arranged in the optical path of the diffracted light A2 and the optical path of the diffracted light B2.

The lens 43 of the irradiation optical system 32 is not a collimator lens, but a lens adapted to cause each of the incident lights A1, B1 split by the polarizing beam splitter to form an image on the diffraction grating 100 with a suitable size.

Further, the lenses 44, 45 are arranged so that the focus positions thereof are identical to each other on the diffraction grating 100.

The incident light A1 is diffracted by the diffraction grating 100, so that a +mth-order diffracted light A2 is generated. The diffracted light A2 is passed through the lens 44 and the quarter-wave plate 7, reflected by the mirror 9, and then passed through the quarter-wave plate 7 and the lens 44 again so as to be incident on the diffraction grating 100 where the diffracted light A2 is diffracted. The diffracted light A2 is diffracted by the diffraction grating 100, so that a twice diffracted light A3 is generated. The twice diffracted light A3 is incident on the polarizing beam splitter 14.

On the other hand, the incident light B1 is diffracted by the diffraction grating 100, so that a −mth-order diffracted light B2 is generated. The diffracted light B2 is passed through the lens 45 and the quarter-wave plate 8, reflected by the mirror 10, and then passed through the quarter-wave plate 8 and the lens 45 again so as to be incident on the diffraction grating 100 where the diffracted light B2 is diffracted. The diffracted light B2 is diffracted by the diffraction grating 100, so that a twice diffracted light B3 is generated. The twice diffracted light B3 is incident on the polarizing beam splitter 14.

Figure 12:
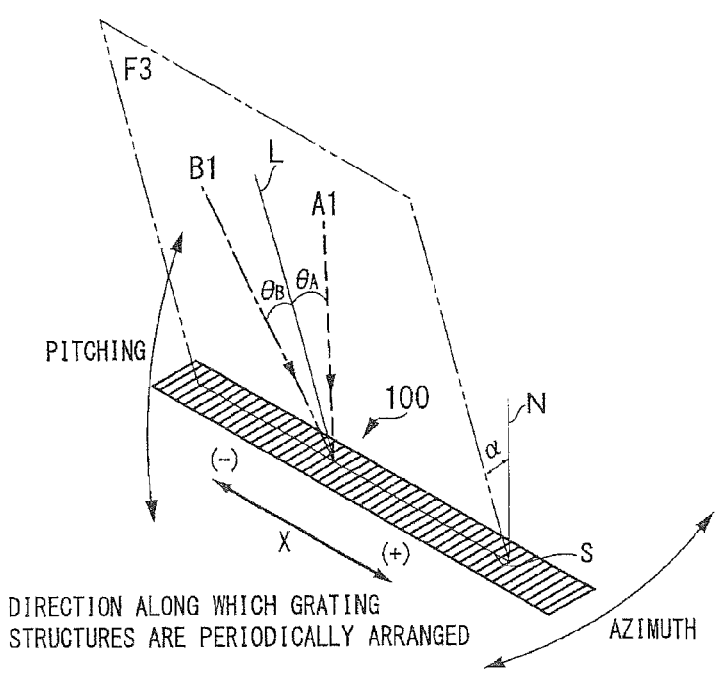
FIG. 12 is a view showing the tilt of the surface having the diffraction grating arranged thereon toward the pitching direction or the azimuth direction.

However, there are cases where the grating surface, which has the diffraction grating 100 arranged thereon, is tilted toward the pitching direction and/or the azimuth direction shown in FIG. 12. The azimuth direction is a direction along which the grating surface rotates around an axis which extends in the Z-direction. Further, the pitching direction is a direction along which the grating surface rotates around an axis which extends in a direction perpendicular to both the X-direction and the Z-direction (the vertical direction).

With the aforesaid configuration, in the displacement detecting device 31, even if the grating surface is tilted toward the pitching direction and/or the azimuth direction, the focus positions of the lenses 44, 45 are located on the diffraction grating 100. Thus, the diffracted light A2 and the diffracted light B2 are constantly perpendicularly incident on the mirror 9 and the mirror 10, and the returned light of the diffracted light A2 and the returned light of the diffracted light B2 are passed through the same optical path so as to be incident on at the same incidence point of the diffraction grating 100. Thus, the optical path lengths of the diffracted lights A2, B2 are equal to the optical path lengths of the returned lights of the diffracted lights A2, B2. Thus, even if the grating surface is tilted toward the pitching direction and/or the azimuth direction, the interference signals detected by the light-receiving elements 24 to 27 can be prevented from declining. Thus, the displacement of the in the Z-direction can be stably detected even when the grating surface is being vibrated or jiggled.

Incidentally, in the displacement detecting device 31, due to the provision of the lenses 44, 45, when the grating surface moves in the Z-direction, the incidence point of the diffracted lights A2, B2 (the returned lights) reflected by the mirrors 9, 10 and incident on the diffraction grating 100 is slightly different from the incidence point of the diffracted lights A1, B1 incident on the diffraction grating 100. Thus, the intensity I of the interference signal is not as simple as expressed in equation (14). However, by obtaining the change of the optical path length by means of ray tracing to calculate the intensity I of the interference signal obtained in the displacement detecting device 31, a result of linear phase changing along with the change of the displacement in the Z-direction can be obtained, similar to equation (11).

Figure 13:
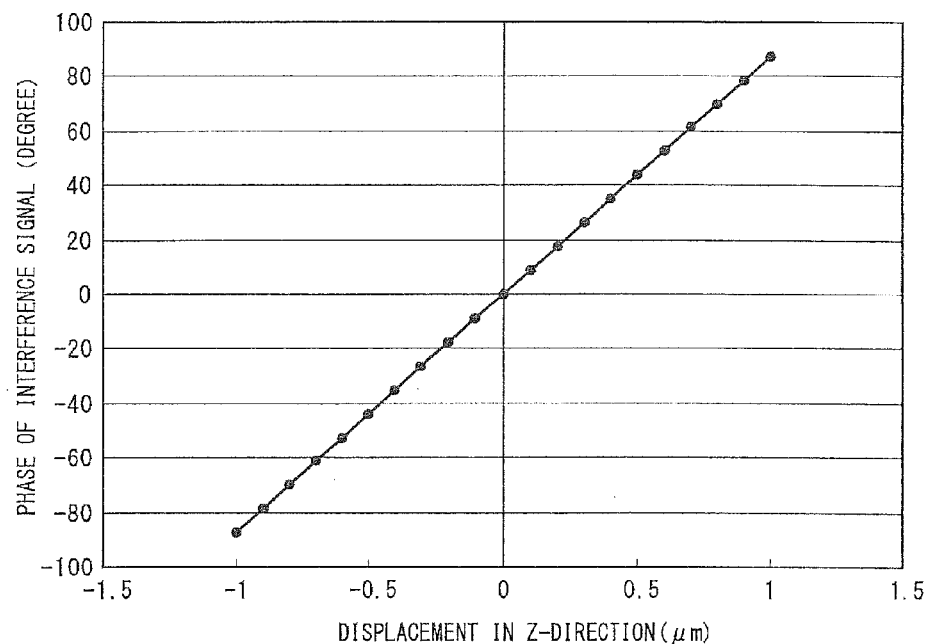
FIG. 13 is a graph showing an interference signal generated in the displacement detecting device according to the second embodiment of the present invention.

The graph shown in FIG. 13 is a calculation result obtained under a condition where the wavelength of the light source is 790 nm, the grating pitch is 1 μm, and the incidence angle $\theta_A$, $\theta_B$ and tilt angle α are each about 2 degrees. One period of the interference signal under such condition is about 4 μm.

Figure 14:
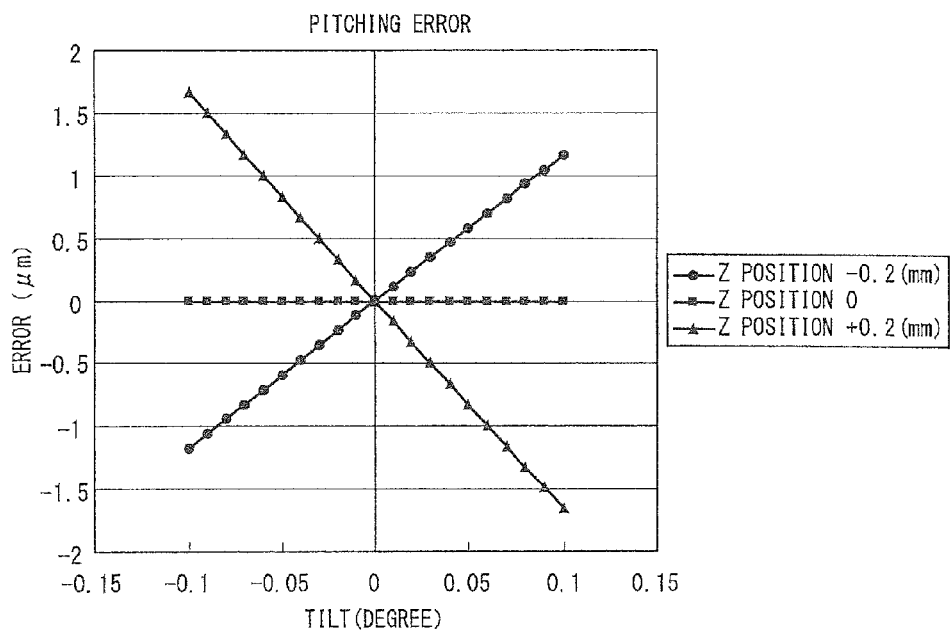
FIG. 14 is a graph showing the detection error generated in the case where the surface having the diffraction grating arranged thereon is tilted toward the pitching direction.

Under the above condition, a calculation result of the error amount caused in the case where the grating surface (the diffraction grating 100) is tilted toward the pitching direction is shown in FIG. 14. Further, under the above condition, a calculation result of the error amount caused in the case where the grating surface is tilted toward the azimuth direction is shown in FIG. 15.

Figure 15:
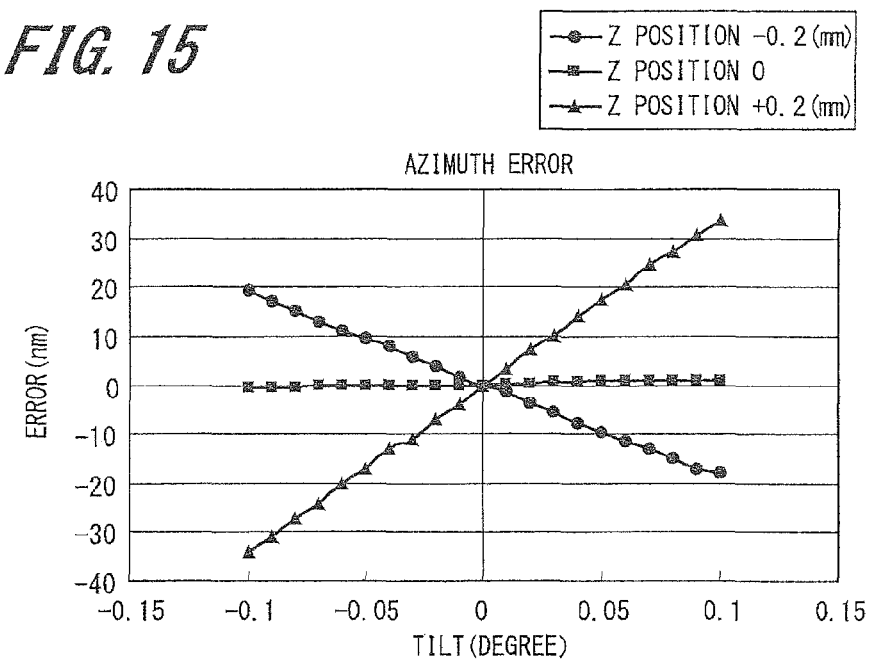
FIG. 15 is a graph showing the detection error generated in the case where the surface having the diffraction grating arranged thereon is tilted toward the azimuth direction.

It can be confirmed from FIGS. 14 and 15 that, in the case where the displacement of the grating surface in the Z-direction is zero (i.e., in the case where the grating surface is in a reference position), no error will be caused even when the grating surface is tilted toward the pitching direction and/or the azimuth direction. Further, it can be confirmed that, in the case where the displacement of the grating surface in the Z-direction is not zero (i.e., in the case where the grating surface is displaced in the Z-direction), detection error will be caused.

The "detection error" in such a case is caused due to the phase change of the interference signal caused by the tilt of the grating surface, although the grating surface is not displaced in the Z-direction. This is because if the grating surface is tilted when the grating surface has moved in the Z-direction, the incidence points of the incident lights A1, B1 on the diffraction grating 100 will not be superimposed on each other at one point, and therefore optical path length difference between the two optical paths will be caused.

For example, the error of the displacement of the grating surface in the Z-direction caused by the tilt of the grating surface can be corrected by previously creating an error-correcting table and storing the table in the storage element, and extracting a suitable correction value from the error-correcting table based on the tilt angle of the grating surface. Incidentally, the tilt of the grating surface can be detected by an angle sensor, a rotation sensor or the like, for example.

<Third Embodiment of Displacement Detecting Device>

Next, a displacement detecting device according to a third embodiment of the present invention will be described below with reference to FIG. 16.

Figure 16:
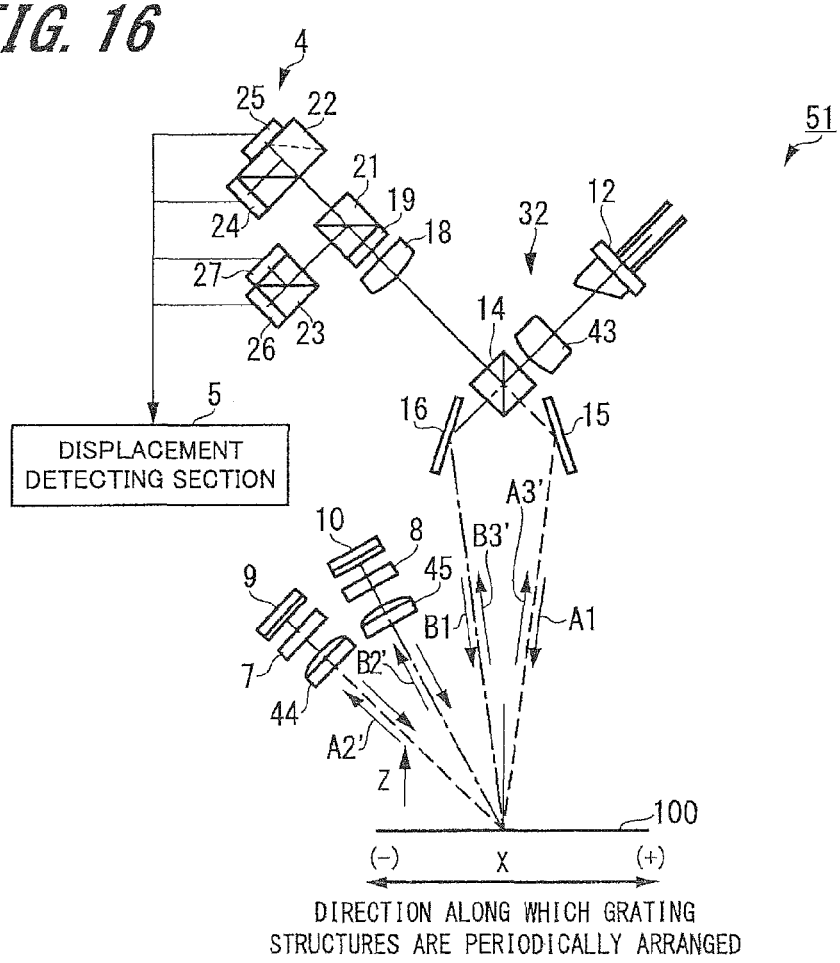
FIG. 16 is a view schematically showing the configuration of a displacement detecting device according to a third embodiment of the present invention.

FIG. 16 is a view schematically showing the configuration of a displacement detecting device 51 according to the third embodiment.

As shown in FIG. 16, the displacement detecting device 51 of the third embodiment has the same configuration as that of the displacement detecting device 31 (see FIG. 11) of the second embodiment. The displacement detecting device 51 differs from the displacement detecting device 31 in that a −mth-order diffracted light A2' of the incident light A1 and a +mth-order diffracted light B2' of the incident light B1 are used.

As shown in FIG. 16, a lens 44, a quarter-wave plate 7 and a mirror 9 are arranged in the optical path of the −mth-order diffracted light A2' of the incident light A1. Further, a lens 45, a quarter-wave plate 8 and a mirror 10 are arranged in the optical path of the +mth-order diffracted light B2' of the incident light B1.

The optic axis of the quarter-wave plate 7 and the optic axis of the quarter-wave plate 8 are respectively tilted at 45 degrees with respect to the polarization direction of the diffracted light A2' and the polarization direction of the diffracted light B2' diffracted by the diffraction grating 100.

The mirror 9 and the mirror 10 are disposed so as to be perpendicular to the optical axis of the diffracted light A2' and the optical axis of the diffracted light B2' respectively, so that the mirror 9 and the mirror 10 respectively reflect the diffracted light A2' and the diffracted light B2' back to the diffraction grating 100.

The incident light A1 is diffracted by the diffraction grating 100, so that the −mth-order diffracted light A2' is generated. The diffracted light A2' is passed through the lens 44 and the quarter-wave plate 7, reflected by the mirror 9, and then passed through the quarter-wave plate 7 and the lens 44 again so as to be incident on the diffraction grating 100 where the diffracted light A2' is diffracted. At this time, the focal point of the returned light of the diffracted light A2' is located on the diffraction grating 100. The diffracted light A2' is diffracted by the diffraction grating 100, so that a twice diffracted light A3' is generated. The twice diffracted light A3' is incident on the polarizing beam splitter 14.

On the other hand, the incident light B1 is diffracted by the diffraction grating 100, so that the +mth-order diffracted light B2' is generated. The diffracted light B2' is passed through the lens 45 and the quarter-wave plate 8, reflected by the mirror 10, and then passed through the quarter-wave plate and the lens 45 again so as to be incident on the diffraction grating 100 where the diffracted light B2' is diffracted. At this time, the focal point of the returned light of the diffracted light B2' is located on the diffraction grating 100. The diffracted light B2' is diffracted by the diffraction grating 100, so that a twice diffracted light B3' is generated. The twice diffracted light B3' is incident on the polarizing beam splitter 14.

The direction of the phase change of the interference signal when the grating surface has moved in the Z-direction in the displacement detecting device 51 is opposite to the direction of the phase change of the interference signal when the grating surface has moved in the Z-direction in the displacement detecting device 31. In other words, in the displacement detecting device 51, the slope of graph of the phase of the interference signal is reversed from that of the graph shown in FIG. 13. However, the error of the displacement in the Z-direction caused by the tilt of the grating surface of the displacement detecting device 51 of the present embodiment and the error of the displacement in the Z-direction caused by the tilt of the grating surface of the displacement detecting device 31 of the second embodiment are equal to each other.

<Fourth Embodiment of Displacement Detecting Device>

Next, a displacement detecting device according to a fourth embodiment of the present invention will be described below.

The displacement detecting device according to the fourth embodiment is configured by the displacement detecting device of the second embodiment and the displacement detecting device 51 of the third embodiment.

The incidence point of the incident light on the diffraction grating 100 in the displacement detecting device 31 is identical to the incidence point of the incident light on the diffraction grating 100 in the displacement detecting device 51. For example, the incident light of the displacement detecting device 31 is incident from the side of the virtual plane F3 shown in FIG. 9, and incident light of the displacement detecting device 51 is incident from the side of the virtual plane F4 shown in FIG. 9.

Further, the incidence angle $\theta_A$, $\theta_B$ of the incident light of the displacement detecting device 31 are identical to the incidence angle $\theta_A$, $\theta_B$ of the incident light of the displacement detecting device 51.

As described in the third embodiment, the direction of the phase change of the interference signal when the grating surface has moved in the Z-direction in the displacement detecting device 51 is opposite to the direction of the phase change of the interference signal when the grating surface has moved in the Z-direction in the displacement detecting device 31. Further, the error of the displacement in the Z-direction caused by the tilt of the grating surface of the displacement detecting device 51 and the error of the displacement in the Z-direction caused by the tilt of the grating surface of the displacement detecting device 31 are equal to each other.

Thus, the difference between the phase of the interference signal detected by the displacement detecting device 31 and the phase of the interference signal detected by the displacement detecting device 51 is calculated, and the displacement of the grating surface in the Z-direction is detected based on the result of the calculation. Thus, the error component of the displacement caused by the tilt of the grating surface can be cancelled.

Next, a modification of the displacement detecting device of the fourth embodiment will be described below with reference to FIG. 17.

Figure 17:
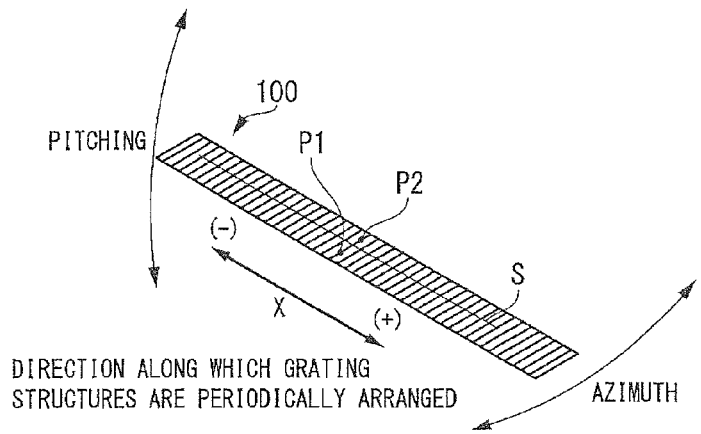
FIG. 17 is a view showing the incident position of the incident light in a displacement detecting device according to a fourth embodiment of the present invention.

FIG. 17 is a view showing the incidence position of the incident light of the modification.

The error caused in the case where the grating surface is tilted toward the pitching direction is larger than the error caused in the case where the grating surface is tilted toward the azimuth direction (see FIGS. 14 and 15).

Thus, in the modification, only the error caused in the case where the grating surface is tilted toward the pitching direction is cancelled. In such a case, as shown in FIG. 17, an incidence point P1 of the incident light in the displacement detecting device 31 and an incidence point P2 of the incident light in the displacement detecting device 51 are separated from each other in a direction perpendicular to both the X-direction and the Z-direction. Thus, even when the grating surface is tilted toward the pitching direction, since the two incident lights are superimposed on each other at the incidence points P1, P2, there will be no error in detection of the displacement of the grating surface in the Z-direction.

<Fifth Embodiment of Displacement Detecting Device>

Next, a displacement detecting device according to a fifth embodiment of the present invention will be described below with reference to FIG. 18.

Figure 18:
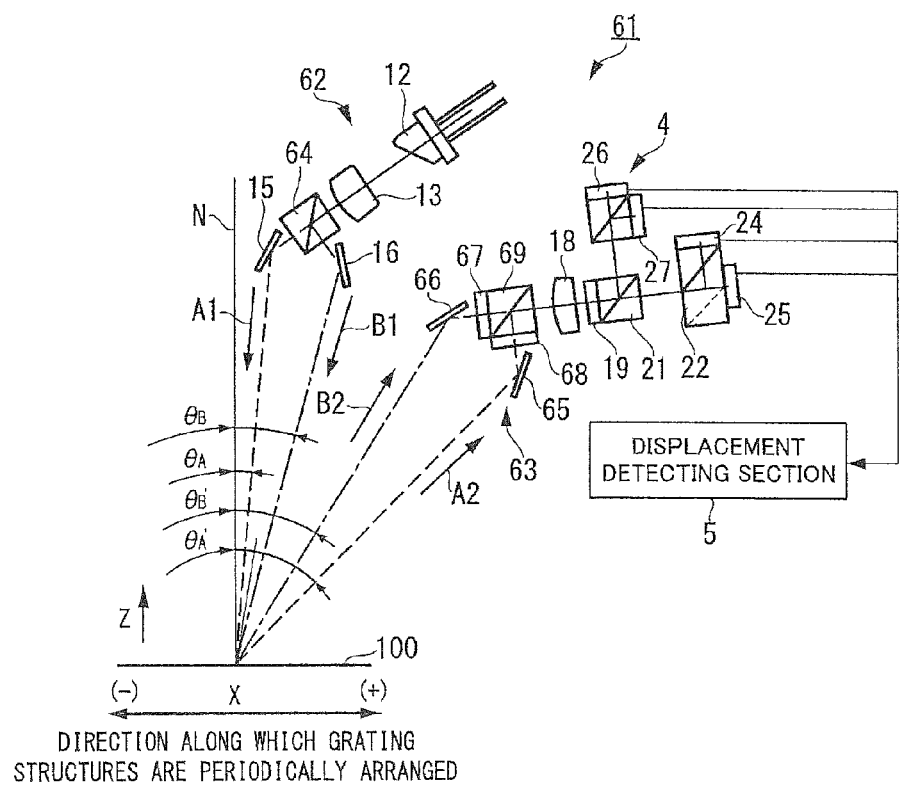
FIG. 18 is a view schematically showing the configuration of a displacement detecting device according to a fifth embodiment of the present invention.

FIG. 18 is a view schematically showing the configuration of a displacement detecting device 61 according to the fifth embodiment.

As shown in FIG. 18, the displacement detecting device 61 of the fifth embodiment has the same configuration as that of the displacement detecting device 1 (see FIG. 7) of the first embodiment. The different portions of the displacement detecting device 61 compared with the displacement detecting device 1 are an irradiation optical system 62 and an interference optical system 63.

The displacement detecting device 61 includes the aforesaid irradiation optical system 62, the aforesaid interference optical system 63, a light-receiving section 4, and a displacement detecting section 5. Further, a reflective diffraction grating 100 is arranged on the surface-to-be-measured.

The irradiation optical system 62 causes two light-beams to be incident on the diffraction grating 100 respectively from one side of a plane perpendicular to the X-direction along which the grating structures of the diffraction grating 100 are periodically arranged. The irradiation optical system 62 includes a light source 12, a collimator lens 13, a beam splitter 64, and two mirrors 15, 16.

The light source 12 is configured by, for example, a multimode semiconductor laser or the like, and is adapted to emit a p-polarized light. The collimator lens 13 is adapted to convert the light emitted from the light source 12 into a collimated light. The polarizing beam splitter 64 is adapted to split the light emitted from the light source 12 and passed through the collimator lens 13 into two light-beams, which are a first incident light A1 and a second incident light B1. The beam splitter 64 is a half mirror, for example, and the ratio of the amount of the incident light A1 to the amount of the incident light B1 is 1:1.

The mirror 15 reflects the incident light A1 so that the incident light A1 is incident on the diffraction grating 100, and the mirror 16 reflects the incident light B1 so that the incident light B1 is incident on the diffraction grating 100. The optical axis of the incident light A1 and the optical axis of the incident light B1 are changed by the mirrors 15, 16, so that the incident light A1 and the incident light B1 are incident substantially at the same point of the diffraction grating 100 respectively from one side of a plane perpendicular to the X-direction. Further, the incident light A1 is diffracted by the diffraction grating 100 to thereby generate a +mth-order diffracted light A2, and the incident light B1 is diffracted by the diffraction grating 100 to thereby generate a +mth-order diffracted light B2.

The interference optical system 63 includes two mirrors 65, 66, a dummy glass 67, a half-wave plate 68, and a polarizing beam splitter 69.

The mirror 65 reflects the diffracted light A2 diffracted by the diffraction grating 100, so that the diffracted light A2 is guided to the polarizing beam splitter 69. Further, the mirror 66 reflects the diffracted light B2 diffracted by the diffraction grating 100, so that the diffracted light B2 is guided to the polarizing beam splitter 69. The angles of the mirrors 65, 66 are adjusted so that the diffracted lights A2, B2 after passing through the polarizing beam splitter 69 are correctly superimposed on each other.

The dummy glass 67 is arranged between the mirror 66 and the polarizing beam splitter 69, and the thickness of the dummy glass 67 is set so that the optical path length of the dummy glass 67 is substantially equal to the optical path length of the half-wave plate 68. The diffracted light B2 passes through the dummy glass 67 without changing the polarization direction, and is incident on the polarizing beam splitter 69 as the p-polarized light.

The half-wave plate 68 is arranged between the mirror 65 and the polarizing beam splitter 69, and is adapted to rotate the polarization direction of the diffracted light A2 by 90 degrees. In other words, by passing through the half-wave plate 68, the diffracted light A2 is converted from the p-polarized light into an s-polarized light.

The polarizing beam splitter 69 reflects the s-polarized diffracted light A2 passed through the half-wave plate 68 and transmits the p-polarized diffracted light B2 passed through the dummy glass 67 to thereby superimpose the two diffracted lights A2, B2 on each other, so that the two diffracted lights A2, B2 are interfered with each other.

Incidentally, since the light-receiving section 4 and the displacement detecting section 5 have the same configuration as those in the first embodiment, the description thereof will be omitted.

Next, the operation of the displacement detecting device 61 will be described below.

As shown in FIG. 18, the light emitted from the light source 12 is converted into a collimated light by the collimator lens 13, and the collimated light is split into the incident light A1 and the incident light B1 by the beam splitter 64. The incident light A1 is reflected by the mirror 15 so as to be incident on the diffraction grating 100 at an incidence angle $\theta_A$. On the other hand, the incident light B1 is reflected by the mirror 16 so as to be incident on the diffraction grating 100 at an incidence angle $\theta_B$.

In other words, the incident light A1 and the incident light B1 are incident on the diffraction grating 100 respectively at different angles with respect to a plane perpendicular to the X-direction along which the grating structures of the diffraction grating 100 are periodically arranged, and the incidence point of the incident light A1 and the incidence point of the incident light B1 are substantially the same.

The incident light A1 is diffracted by the diffraction grating 100, so that a +mth-order diffracted light A2 is generated. The diffracted light A2 is tilted at an angle of $\theta_A'$ with respect to a plane perpendicular to the X-direction. In other words, the diffraction angle of the diffracted light A2 is $\theta_A'$. The diffracted light A2 is reflected by the mirror 65, passed through the half-wave plate 68, and incident on the polarizing beam splitter 69.

On the other hand, the incident light B1 is diffracted by the diffraction grating 100, so that the +mth-order diffracted light B2 is generated. The diffracted light B2 is tilted at an angle of $\theta_B'$ with respect to the plane perpendicular to the X-direction. In other words, the diffraction angle of the diffracted light B2 is $\theta_B'$. The diffracted light B2 is reflected by the mirror 66, passed through the dummy glass 67, and incident on the polarizing beam splitter 69.

The diffracted lights A2, B2 are superimposed on each other by the polarizing beam splitter 69 so as to be interfered with each other. The diffracted lights A2, B2 having been superimposed on each other pass through the lens and the quarter-wave plate 19 of the light-receiving section 4 so as to become two circularly polarized lights with mutually reversed rotational directions.

Thereafter, the operations of the light-receiving section 4 and the displacement detecting section 5 are performed, and these operations are identical to those of the first embodiment. In other words, the displacement detecting section counts the phase change per unit time of the generated incremental signals by a counter, and detects the displacement of the grating surface in the Z-direction based on the count value.

In the displacement detecting device 61 according to the present embodiment, in the case where the grating surface has moved in the Z-direction, the amplitudes $E_A$, $E_B$ of the diffracted lights A2, B2 are expressed by equations (8) and (9). Further, the intensity I of the interference signal is expressed by equation (10).

However, if the period $\Lambda$ of the diffraction grating is reduced to a value close to the wavelength $\lambda$ of the incident light, the diffraction efficiency of the diffracted light will become dependent on the polarization direction. Further, high diffraction efficiency will be exhibited for p-polarized incident light. In the present embodiment, since the incident light A1 and the incident light B1 are p-polarized lights, high diffraction efficiency can be achieved, and displacement can be detected at high resolution.

Figure 19A:
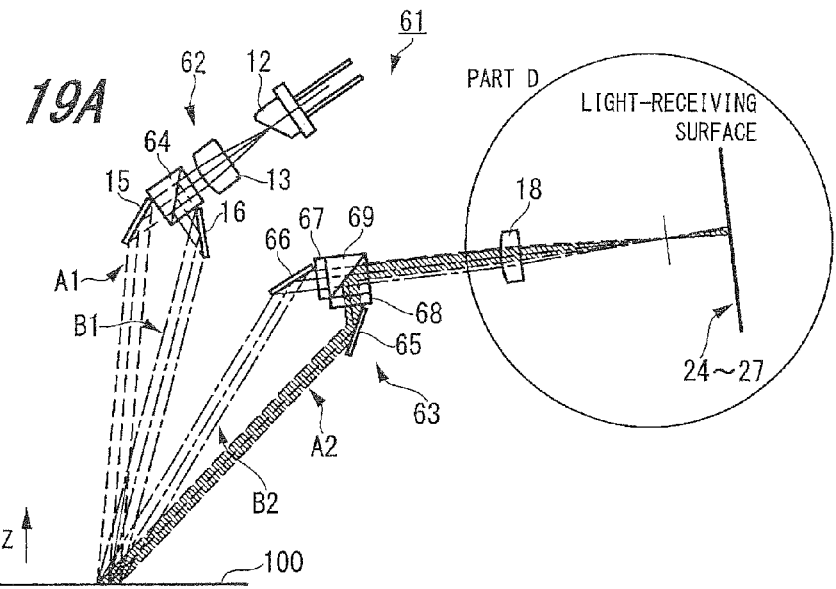
FIGS. 19A and 19B are views showing the superposition of the diffracted lights in the displacement detecting device according to the fifth embodiment of the present invention.
Figure 19B:
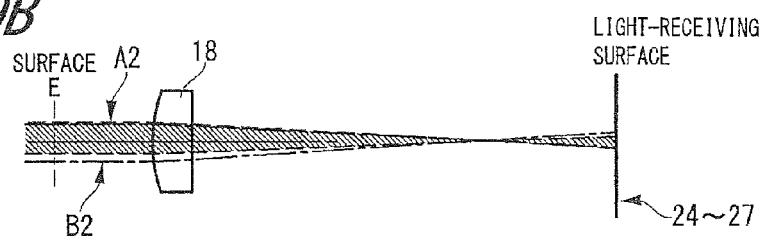

FIG. 19A is a view showing misalignment of the superposition of the diffracted lights in the displacement detecting device 61. FIG. 19B is an enlarged view showing a part D of FIG. 19A. Incidentally, in FIGS. 19A and 19B, the components from the lens 18 to the light-receiving elements 24 to 27 are omitted, so that misalignment of the superposition of the diffracted lights A2, B2 can be more easily understood.

Figure 20:
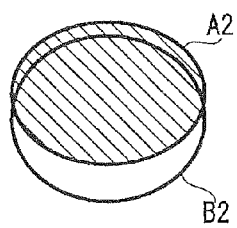
FIG. 20 is a view showing misalignment of the superposition of the diffracted lights on a surface E shown in FIG. 19B.
Figure 21:
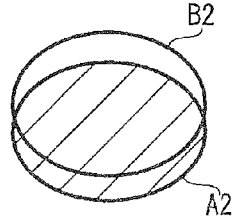
FIG. 21 is a view showing misalignment of the superposition of the diffracted lights on a light-receiving surface shown in FIG. 19B.

FIG. 20 is a view showing misalignment of the superposition of the diffracted lights A2, B2 on a surface E shown in FIG. 19B. FIG. 21 is a view showing misalignment of the superposition of the diffracted lights A2, B2 on a light-receiving surface shown in FIG. 19B.

As shown in FIGS. 19A to 21, in the displacement detecting device 61, in the case where the grating surface (the diffraction grating 100) has moved in the Z-direction, there will be misalignment of the superposition of the diffracted lights A2, B2. Thus, since the interference signal becomes small, the range of the displacement possible to be detected in the Z-direction becomes narrow.

In the present embodiment, a multimode semiconductor laser is used as the light source 12. Thus, error caused by mode hopping can be prevented, while the error caused by mode hopping can not be prevented if a single-mode semiconductor laser is used as the light source. Further, since the multimode semiconductor laser has short coherence length compared with a single-mode semiconductor laser, it is possible to maximize the visibility of the interference signal. Thus, the optical path length difference between the two diffracted lights A2, B2 to be interfered with each other can be minimized, error caused by variation of the emission wavelength of the semiconductor laser can be reduced.

Incidentally, the coherence length in the case where a multimode semiconductor laser is used needs to be sufficiently longer than "ΔLA-ΔLB" shown in equation (11). This is because if the coherence length is shorter than "ΔLA-ΔLB", the interference signal will decline significantly due to the optical path length difference caused by "ΔLA-ΔLB".

Further, a DFB (distributed feedback) laser or a DBR (distributed Bragg reflector) laser exhibiting no mode hopping may also be used as the light source of the present invention. Incidentally, since the DFB laser and the DBR laser have long coherence length, it is necessary to either previously adjust the optical path using a light source having short coherence length, or precisely control the temperature of the DFB laser or the DBR laser to prevent the error caused by wavelength variation.

<Sixth Embodiment of Displacement Detecting Device>

Next, a displacement detecting device according to a sixth embodiment of the present invention will be described below with reference to FIG. 22.

Figure 22:
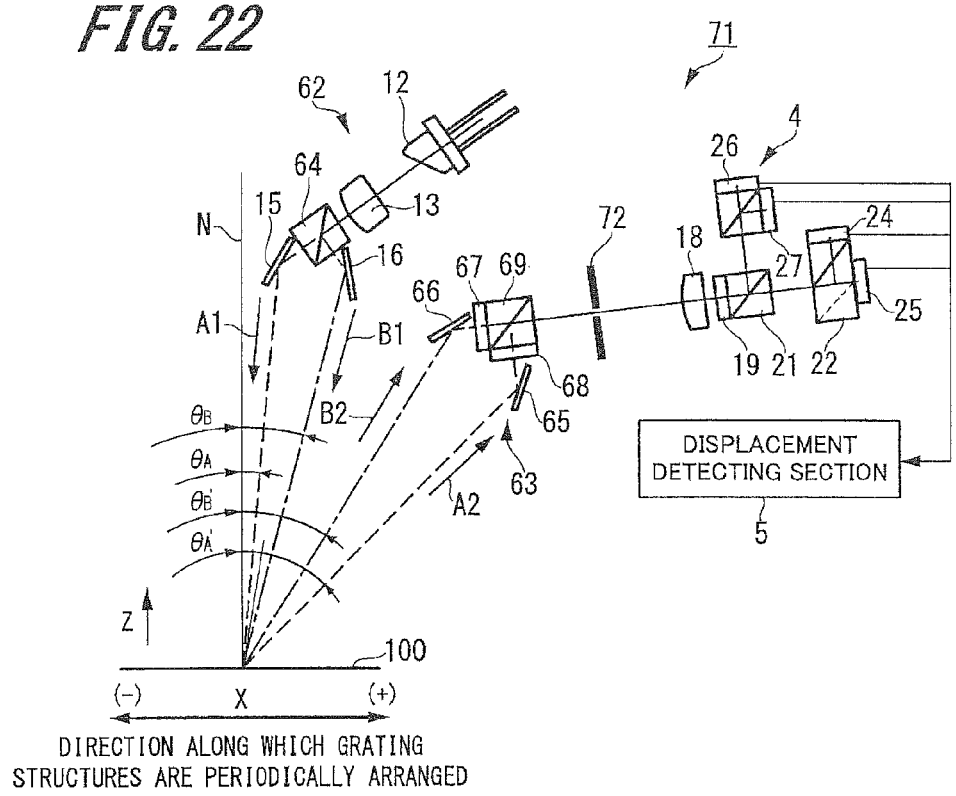
FIG. 22 is a view schematically showing the configuration of a displacement detecting device according to a sixth embodiment of the present invention.

FIG. 22 is a view schematically showing the configuration of a displacement detecting device 71 according to the sixth embodiment.

The displacement detecting device 71 of the sixth embodiment is configured to alleviate the problems with the displacement detecting device 61 of the fifth embodiment (see FIGS. 19A to 21). The displacement detecting device 71 has the same configuration as that of the displacement detecting device 61 (see FIG. 18) of the fifth embodiment. The displacement detecting device 71 differs from the displacement detecting device 61 in that the displacement detecting device 71 is provided with a diaphragm member 72.

As shown in FIG. 22, the diaphragm member 72 is arranged between a polarizing beam splitter 69 and a lens 18. The diaphragm member 72 has a circular shaped aperture. The diameter of the aperture of the diaphragm member 72 is set so that only the superimposed part of the diffracted lights A2, B2 can be passed through the aperture even when the grating surface (the diffraction grating 100) has moved in the Z-direction.

Incidentally, the diameter of the aperture of the diaphragm member 72 may also be adjustable.

Figure 23A:
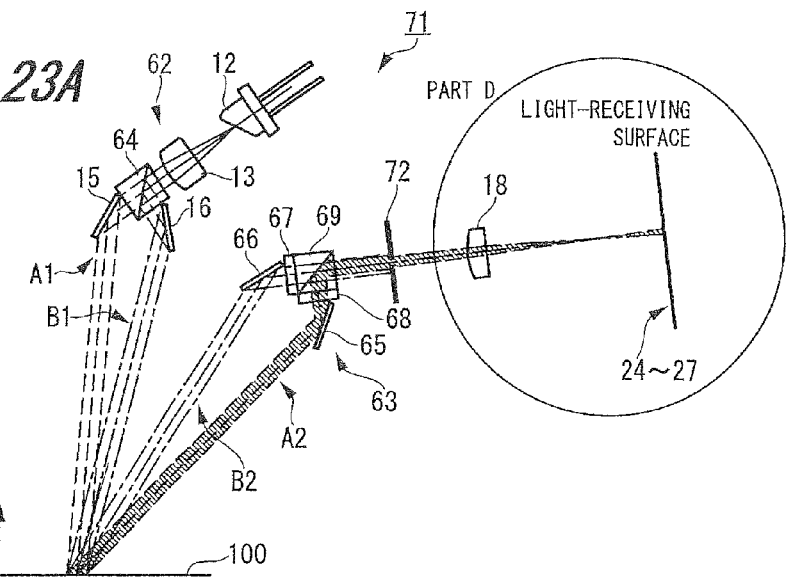
FIGS. 23A and 23B are views showing the superposition of the diffracted lights in the displacement detecting device according to the sixth embodiment of the present invention.
Figure 23B:
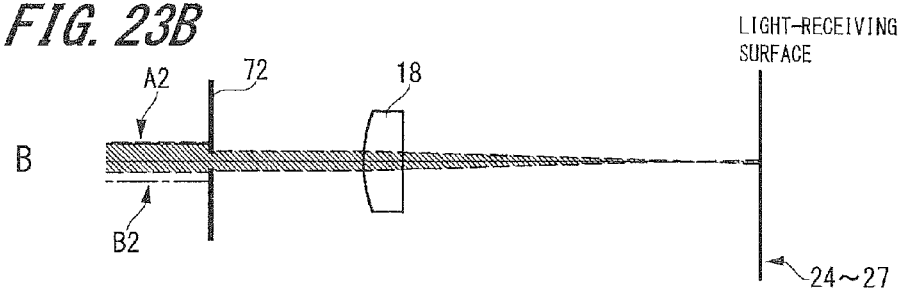

FIG. 23A is a view showing misalignment of the superposition of the diffracted lights in the displacement detecting device 71. FIG. 23B is an enlarged view showing a part D of FIG. 23A. Incidentally, in FIGS. 23A and 23B, the components from the lens 18 to the light-receiving elements 24 to 27 are omitted, so that misalignment of the superposition of the diffracted lights A2, B2 can be more easily understood.

Figure 24:
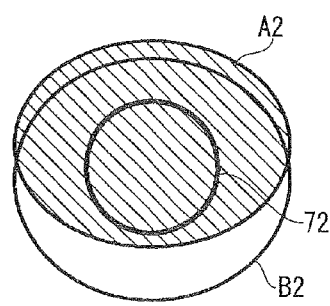
FIG. 24 is a view showing misalignment of the superposition of the diffracted lights on a diaphragm member shown in FIGS. 23A and 23B.
Figure 25:
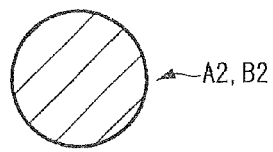
FIG. 25 is a view showing the superposition of the diffracted lights on the light-receiving surface shown in FIGS. 23A and 23B.

FIG. 24 is a view showing misalignment of the superposition of the diffracted lights A2, B2 on the diaphragm member 72 shown in FIGS. 23A and 23B. FIG. 25 is a view showing the superposition of the diffracted lights A2, B2 on the light-receiving surface shown in FIGS. 23A and 23B.

As shown in FIGS. 23A, 23B and 24, misalignment of the superposition is caused in the diffracted lights A2, B2 before passing through the diaphragm member 72. The diaphragm member 72 only allows the superimposed part of the diffracted lights A2, B2 to be passed therethrough.

As a result, only the superimposed part of the diffracted lights A2, B2 is incident on the light-receiving surface. Thus, in the displacement detecting device 71, since the interference signal can be controlled to a constant level in a range wider than the displacement detecting device 61 of the fifth embodiment, the range of the displacement possible to be detected in the Z-direction can be enlarged.

Incidentally, the diffracted lights A2, B2 on the diaphragm member 72 need to have a certain level of size so that sufficient superimposed part can be reliably obtained in a necessary measurement range, and it is preferred that the diffracted lights A2, B2 each have a flat intensity distribution. Further, in the case where the diffracted lights A2, B2 are each a light-beam having a Gaussian distribution, it is effective to use a homogenizer to convert the distribution of the diffracted lights A2, B2 to a top hat distribution.

Further, the diaphragm member 72 is not limited to be arranged between the polarizing beam splitter 69 and the lens 18, but can be arranged at other positions as long as the diaphragm member 72 is arranged between the diffraction grating 100 and the light-receiving element.

Figure 26A:
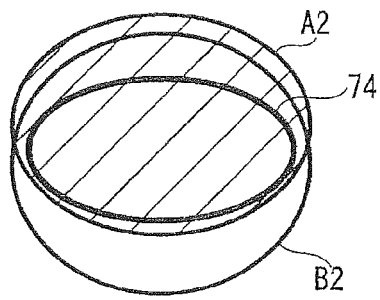
FIGS. 26A and 26B are views showing modifications of the diaphragm member of the displacement detecting device according to the sixth embodiment of the present invention.
Figure 26B:
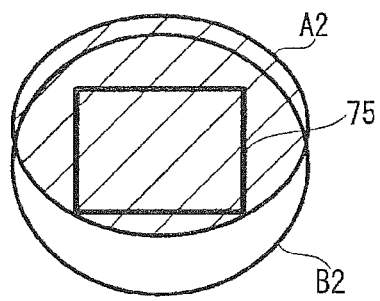

FIG. 26A is a view showing a first modification of the diaphragm member. FIG. 26B is a view showing a second modification of the diaphragm member.

A diaphragm member 74 shown in FIG. 26A has an oval aperture. Further, a diaphragm member 75 shown in FIG. 26A has a rectangular aperture. The size of the apertures of the diaphragm members 74, 75 corresponds to the superimposed part of the diffracted lights A2, B2. Thus, compared with the case where the diaphragm member 72 is used, relatively large portion of the superimposed part of the diffracted lights A2, B2 can be passed through, and therefore relatively strong interference signal can be obtained.

Incidentally, although the apertures of the diaphragm member 74, 75 shown in FIGS. 26A and 26B are respectively formed in oval shape and rectangle shape, the shape of the aperture of the diaphragm member of the present invention may be suitably designed as long as the aperture can only allow the superimposed part of the diffracted lights A2, B2 to be passed therethrough.

<Seventh Embodiment of Displacement Detecting Device>

Next, a displacement detecting device according to a seventh embodiment will be described below with reference to FIGS. 27A to 27C.

Figure 27A:
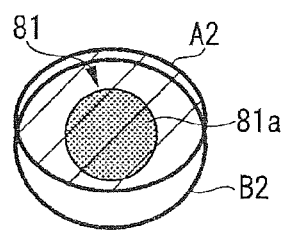
FIGS. 27A to 27C are views showing examples of a light-receiving surface of a light-receiving section of a displacement detecting device according to a seventh embodiment of the present invention.

FIG. 27A is a view showing a first example of a light-receiving element of the displacement detecting device according to the seventh embodiment. FIG. 27B is a view showing a second example of the light-receiving element, and FIG. 27C is a view showing a third example of the light-receiving element.

The displacement detecting device of the seventh embodiment is configured to alleviate the problems with the displacement detecting device 61 of the fifth embodiment (see FIGS. 19A to 21). The only difference between the displacement detecting device of the seventh embodiment and the displacement detecting device 61 is the light-receiving element. Thus, herein the description will be made for the light-receiving element of the seventh embodiment.

A light-receiving element 81 shown in FIG. 27A has a circular light-receiving surface 81a. The diameter of the light-receiving surface 81a is set to a size smaller than the superimposed part of the diffracted lights A2, B2. Since such a light-receiving surface 81a is equivalent to providing the diaphragm member of the sixth embodiment, the range of the displacement possible to be detected in the Z-direction can be enlarged, as in the case of the sixth embodiment.

Figure 27B:
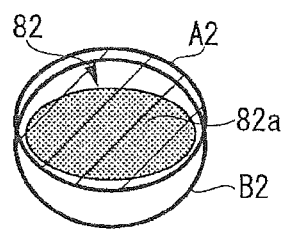
Figure 27C:
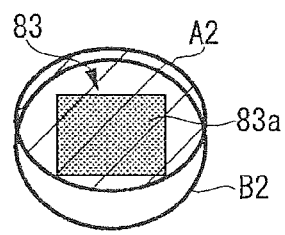

A light-receiving element 82 shown in FIG. 27B has an oval light-receiving surface 82a. Further, a light-receiving element 83 shown in FIG. 27C has a rectangular light-receiving surface 83a. The diameters of the light-receiving surfaces 82a, 83a of the light-receiving elements 82, 83 are each set to a size smaller than the superimposed part of the diffracted lights A2, B2. Thus, compared with the case where the light-receiving element 81 is used, relatively large portion of the superimposed part of the diffracted lights A2, B2 can be received, and therefore relatively strong interference signal can be obtained.

Incidentally, the shape of the light-receiving surface of the light-receiving element of the present invention may be suitably designed as long as the light-receiving surface has an area that only allow the superimposed part of the diffracted lights A2, B2 to be received.

<Eighth Embodiment of Displacement Detecting Device>

First, the phenomenon of misalignment of diffracted lights A2, B2 in the displacement detecting device 71 of the sixth embodiment will be described below with reference to FIGS. 28A and 28B.

Figure 28A:
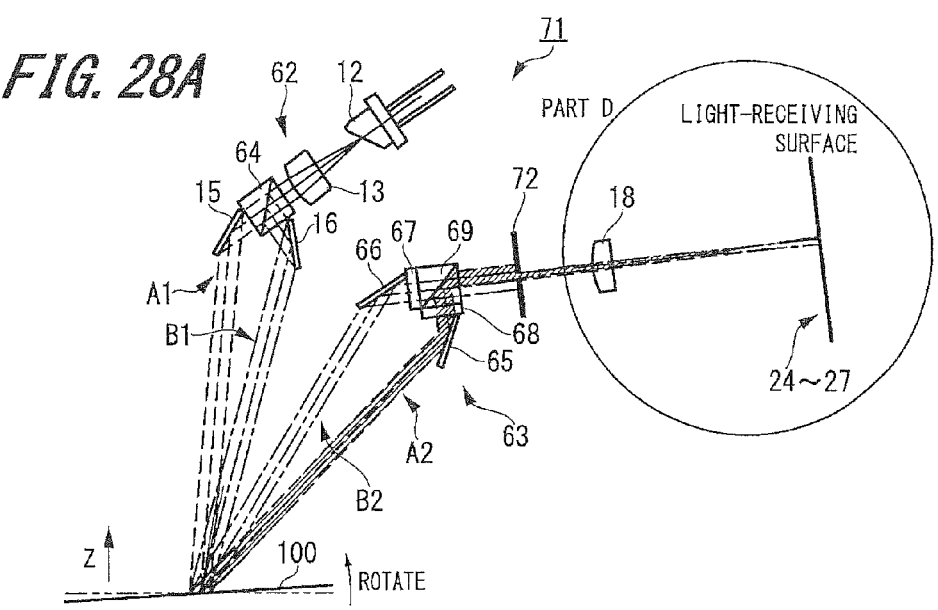
FIGS. 28A and 28B are views showing misalignment of the diffracted lights in the displacement detecting device according to the sixth embodiment of the present invention, in the case where the diffraction grating is rotated toward the pitching direction.

FIG. 28A is a view showing misalignment of the diffracted lights in the displacement detecting device 71 in the case where the grating surface (the diffraction grating 100) is rotated toward the pitching direction. FIG. 23B is an enlarged view showing a part D of FIG. 28A. Incidentally, in FIGS. 28A and 28B, the components from the lens 18 to the light-receiving elements 24 to 27 are omitted, so that misalignment of the superposition of the diffracted lights A2, B2 can be more easily understood.

Figure 28B:
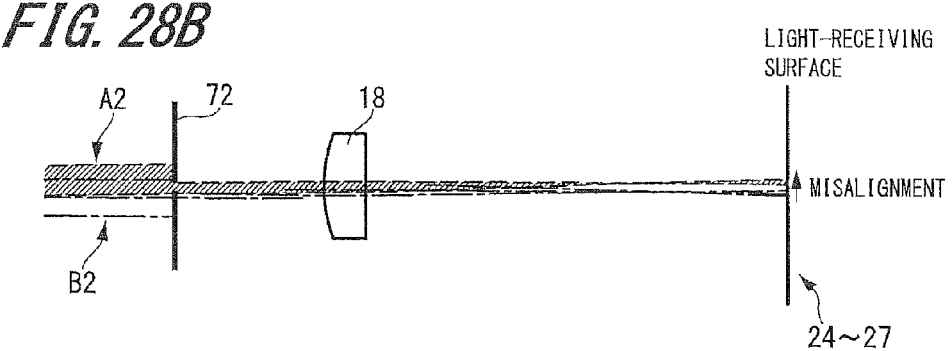

As shown in FIGS. 28A and 28B, in the displacement detecting device 71, when the grating surface (the diffraction grating 100) is rotated toward the pitching direction, the diffracted lights A2, B2 will pass through the aperture of the diaphragm member 72 at different angles. Thus, misalignment of the diffracted lights A2, B2 will be generated on the light-receiving surface of each the light-receiving elements 24 to 27. As a result, the interference signal obtained by each the light-receiving elements 24 to 27 becomes weak, and therefore it is difficult to detect the displacement of the grating surface in the Z-direction.

Next, a displacement detecting device according to an eighth embodiment of the present invention will be described below with reference to FIGS. 29 and 30.

Figure 29:
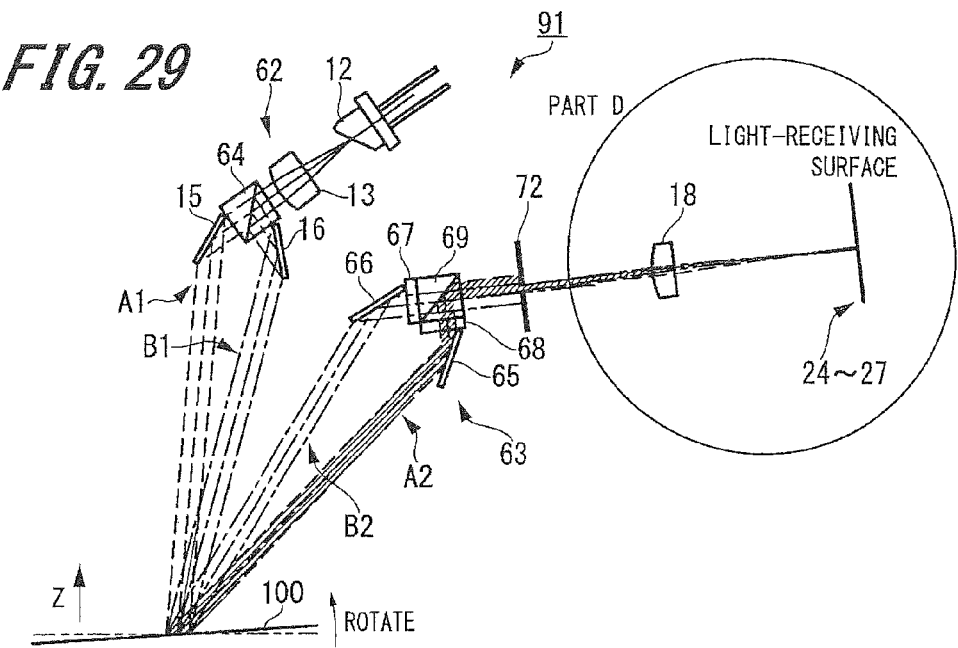
FIG. 29 is a view schematically showing the configuration of a displacement detecting device according to an eighth embodiment of the present invention.

FIG. 29 is a view schematically showing the configuration of a displacement detecting device 91 according to the eighth embodiment of the present invention. FIG. 30 is a view showing the position of an imaging optical system of the displacement detecting device 91 according to the eighth embodiment of the present invention. Incidentally, in FIG. 29, the components from the lens 18 to the light-receiving elements 24 to 27 are omitted, so that the superposition of the diffracted lights A2, B2 can be more easily understood.

The displacement detecting device 91 of the eighth embodiment is configured to alleviate the problems with the displacement detecting device 71 of the sixth embodiment (see FIGS. 28A and 28B). The displacement detecting device 91 differs from the displacement detecting device 61 in that, in the displacement detecting device 91, the lens 18 functions as the imaging optical system of the present invention.

The lens 18 is arranged in a position so that the images of the diffracted lights A2, B2 at the diaphragm member 72 are formed on the light-receiving surface. Thus, the diffracted lights A2, B2 passed through the aperture of the diaphragm member 72 at a suitable angle are incident at the image position of the diaphragm member 72 on the light-receiving surface. As a result, since there is neither misalignment of the superposition of the diffracted lights A2, B2 nor misalignment of the wave fronts of the diffracted lights A2, B2 on the light-receiving surface, it is possible to prevent the declining of the interference signal even when the grating surface (the diffraction grating 100) is rotated toward the pitching direction. Further, the range of the displacement possible to be detected in the Z-direction can be secured.

Incidentally, the wave front mentioned above means a surface having the same phase in each of the beams of the diffracted lights A2, B2. If the wave fronts are misaligned, phase difference will be generated in the diffracted lights A2, B2 to be interfered with each other, and therefore the interference signal will decline.

Figure 30:
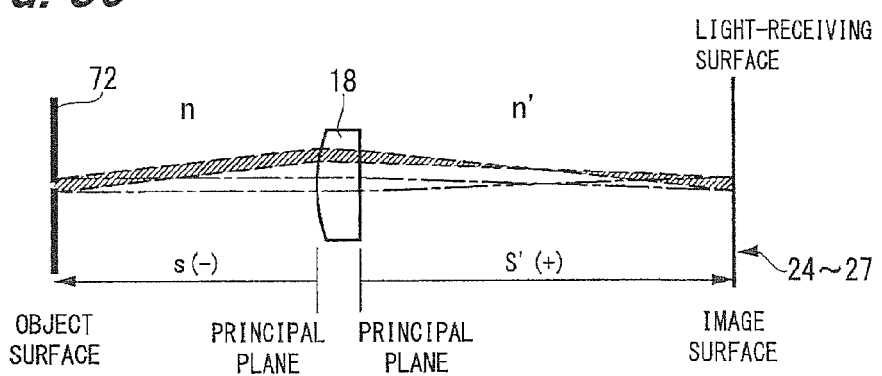
FIG. 30 is a view showing the position of an imaging optical system in the displacement detecting device according to the eighth embodiment of the present invention.
Figure 31:
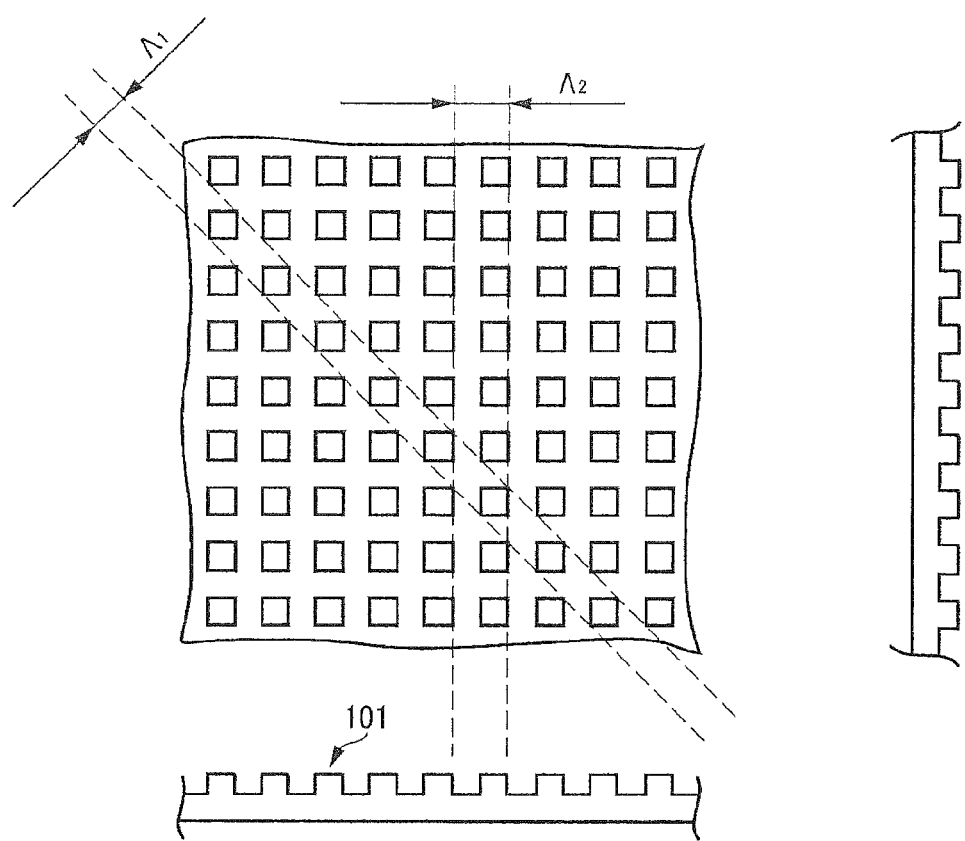
FIG. 31 is a view showing a second concrete example of the diffraction grating.

As shown in FIG. 30, the distance between the diaphragm member 72 and one principal plane of the lens 18 is denoted by "s", the refractive index of the space of the distance "s" is denoted by "n", the distance between the other principal plane of the lens 18 and the light-receiving surface is denoted by "s'", and the refractive index of the space of the distance "s'" is denoted by "n'". Incidentally, the principal plane is a plane which includes the principal point of the lens. Thus, the distance s is the distance between the diaphragm member 72 and one principal point of the lens 18, and the distance s' is the distance between the other principal point of the lens 18 and the light-receiving surface.

Further, the focal length of the lens 18 on the side of the diaphragm member 72 is denoted by "f", and the focal length of the lens 18 on the side of the light-receiving elements 24 to 27 is denoted by "f'". In such a case, the positional relation between the diaphragm member 72, the lens 18 and the light-receiving elements 24 to 27 is expressed by the following equation.

$$n'/s' - n/s = n'/f' = n/f \qquad (19)$$

Since equation (19) is an approximate equation, in practice the position of the lens 18 is adjusted by means of ray tracing or the like so that the misalignment of the diffracted lights A2, B2 becomes minimum. Further, the shape of the aperture of the diaphragm member 72 may be suitably designed. For example, similar to the displacement detecting device 71 of the sixth embodiment, the aperture of the diaphragm member 72 may be designed in an oval shape or a rectangle shape to thereby intensify the interference signal.

It is to be understood that the present invention is not limited to the embodiments described above and shown in the attached drawings, and various modifications can be made without departing from the spirit and scope of the present invention. For example, the aforesaid embodiments are described using an example in which the diffraction grating is a diffraction grating 100 configured by arranging the grating structures of the diffraction grating in a linear fashion (see FIG. 1). However, the diffraction grating of the present invention may also be a diffraction grating configured by arranging the grating structures repeatedly in two dimensions, such as a diffraction grating 101 shown in FIG. 31. In such a case, since there are a plurality of periods of grating structures, such as $\Lambda_1$, $\Lambda_2$, any one of these periods of grating structures may be used as the pitch of diffraction grating.

Further, although the aforesaid embodiments are described using an example in which a reflective diffraction grating is used, a transmission diffraction grating may also be used in the present invention. Further, in the present invention, the kinds of the diffraction grating are not particularly limited. For example, the diffraction grating of the present invention may alternatively be an amplitude diffraction grating having a bright and dark pattern marked thereon, or a phase diffraction grating having refractive index change or a shape change marked thereon.

What is claimed is:

1. A displacement detecting device to detect a displacement of a surface having a diffraction grating arranged thereon, in a direction perpendicular to the surface, the displacement detecting device comprising:

an irradiation optical system including a beam splitter to split a light from a light source into two light-beams and a first pair of mirrors to reflect the two light-beams so as to be incident on the diffraction grating, the irradiation optical system structured to cause the two light-beams to be incident on substantially a same point of the diffraction grating respectively from opposite directions at different angles, with respect to a plane perpendicular to a direction along which grating structures of the diffraction grating are periodically arranged, so that a +mth-order diffracted light and a −mth-order diffracted light of each of the two light-beams incident on the diffraction grating are generated; and a second pair of mirrors arranged to reflect the +mth-order diffracted light of one of the two-light beams incident on the diffraction grating and the −mth-order diffracted light of the other one of the two light-beams incident on the diffraction grating, that have been generated at the diffraction grating, so as to return to the same point of the diffraction grating at which the two light-beams have been incident and to be diffracted again by the diffraction grating, wherein, when it is defined that an incident angle between a normal line of the surface having the diffraction grating arranged thereon and an incident light onto the diffraction grating is always positive, and a diffraction angle between the normal line and a diffracted light of the incident light is positive when the diffracted light is on a same side of the incident light with respect to the normal line and negative when the diffracted light is on the opposite side of the incident light with respect to the normal line, each incident angle of the two light-beams incident on the diffraction grating and each diffraction angle of the +mth-order diffracted light of one of the two light-beams incident on the diffraction grating and the +mth-order diffracted light of the other of the two light-beams incident on the diffraction grating that have been generated at the diffraction grating and reflected by the second pair of mirrors so as to return to the same point of the diffraction grating at which the two light-beams have been incident, satisfy an equation $\sin\theta_n = m\lambda_0/\Lambda n - \sin\theta$, in which $\theta$ represents an incident angle between a normal line of the surface having the diffraction grating arranged thereon and an incident light to the diffraction grating, $\theta n$ represents a diffraction angle between the normal line and a diffracted light, $\lambda_0$ represents a wavelength of the incident light, m represents a diffraction order of the diffracted light, $\Lambda$ represents a pitch of the diffraction grating, and n represents a refractive index of a medium surrounding the diffraction grating, such that phase changes of the +mth order diffracted light of one of the two light-beams incident on the diffraction grating and the −mth order diffracted light of the other of the two light-beams incident on the diffraction grating, that have been generated at the diffraction grating and reflected by the second pair of mirrors so as to return to the same point of the diffraction grating at which the two light-beams have been incident, are in phase when the diffraction grating moves in the direction along which grating structures of the diffraction grating are periodically arranged, and are not in phase when the diffraction grating moves in the direction perpendicular to the surface having the diffraction grating arranged thereon, and wherein the irradiation optical system is further structured to serve as an interference optical system to cause the +mth-order diffracted light of one of the two light-beams and the −mth-order diffracted light of the other one of the two light-beams that have been reflected by the second pair of mirrors so as to return to the diffraction grating, and diffracted again by the diffraction grating, to interfere with each other, so as to generate an interference light, the first pair of mirrors reflecting the +mth-order diffracted light of one of the two light-beams and the −mth-order diffracted light of the other one of the two light-beams that have been diffracted again by the diffraction grating, so as to be guided to the first beam splitter, and the first beam splitter causing the +mth-order diffracted light and the −mth-order diffracted light that have been guided to the first beam splitter, to interfere with each other to generate the interference light, the displacement detecting device further comprising:

a light-receiving section structured to receive the interference light generated by the interference optical system and generate an interference signal, the light-receiving section including a quarter-wave plate arranged so that the +mth-order diffracted light and the −mth-order diffracted light of the interference light having passed through the quarter-wave plate become two circularly polarized lights with mutually reversed rotational directions, a second beam splitter that splits the interference light that is incident thereon into two beams, two polarizing beam splitters that respectively split each incident beam of the two beams into an s-polarized component and a p-polarized component, and photodiodes that respectively receive the s-polarized and p-polarized components of the two beams and obtain respective electric signals as the interference signal; and a displacement detection section including an A/D converter and an arithmetic unit, structured to detect a displacement of the surface having the diffraction grating arranged thereon, in a direction perpendicular to the surface, based on a change in intensity of the interference signal that has been generated at the light-receiving section, the A/D converter converting the electrical signal obtained by the photodiodes into digital signals, and the arithmetic unit generating two phase incremental signals after performing a waveform correction on the digital signals and calculating the displacement based on the two phase incremental signals.

2. The displacement detecting device according to claim 1, further comprising:
a diaphragm member arranged in an optical path between the diffraction grating and the light receiving section, the diaphragm member having an aperture smaller than the width of a light-beam of the interference light.

3. The displacement detecting device according to claim 2, further comprising:
a lens to form an image of the interference light on a light-receiving surface of the light-receiving section.

* * * * *